(12) United States Patent
Ryu et al.

(10) Patent No.: US 12,408,174 B2
(45) Date of Patent: Sep. 2, 2025

(54) TRANSMISSION CONFIGURATION INDICATOR STATE ACTIVATION TECHNIQUES FOR CARRIER AGGREGATION

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US); Tianyang Bai, Somerville, NJ (US); Junyi Li, Chester, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 17/019,002

(22) Filed: Sep. 11, 2020

(65) Prior Publication Data

US 2021/0084625 A1 Mar. 18, 2021

Related U.S. Application Data

(60) Provisional application No. 62/900,587, filed on Sep. 15, 2019.

(51) Int. Cl.
*H04W 72/23* (2023.01)
*H04L 5/00* (2006.01)
(Continued)

(52) U.S. Cl.
CPC ............ *H04W 72/23* (2023.01); *H04L 5/001* (2013.01); *H04L 5/0094* (2013.01); *H04W 28/06* (2013.01); *H04W 72/0453* (2013.01)

(58) Field of Classification Search
CPC . H04W 72/23; H04W 72/0453; H04W 28/06; H04W 56/0005; H04W 56/0015; H04L 5/001; H04L 5/0094
See application file for complete search history.

(56) References Cited

U.S. PATENT DOCUMENTS

| 11,191,076 B2 * | 11/2021 | Shi ........................ H04L 5/0053 |
| 2018/0255512 A1 * | 9/2018 | Lee ........................ H04W 72/23 |

(Continued)

FOREIGN PATENT DOCUMENTS

| CN | 110062397 A | 7/2019 |
| WO | WO-2018121495 A1 | 7/2018 |

OTHER PUBLICATIONS

International Search Report and Written Opinion—PCT/US2020/050734—ISA/EPO—dated Jan. 11, 2021.

(Continued)

*Primary Examiner* — Redentor Pasia
(74) *Attorney, Agent, or Firm* — Holland & Hart /QUALCOMM Incorporated

(57) ABSTRACT

Methods, systems, and devices for wireless communications are described in which different component carriers (CCs) or bandwidth parts (BWPs) of a system operating according to carrier aggregation may be configured with different transmission configuration indicator (TCI) states. A base station may transmit control information to a user equipment (UE) to activate two or more CCs, and that indicates two or more different sets of TCI states that are activated for the two or more CCs. The control information may be transmitted to the UE in a single MAC-CE. The single MAC-CE to activate different sets of TCI states at CCs or BWPs may allow for a reduced number of MAC-CEs used for conveying the set of active TCI states for the CCS or BWPs.

62 Claims, 22 Drawing Sheets

(51) Int. Cl.
*H04W 28/06* (2009.01)
*H04W 72/0453* (2023.01)

(56) References Cited

U.S. PATENT DOCUMENTS

| | | | |
|---|---|---|---|
| 2019/0081763 A1* | 3/2019 | Akkarakaran | H04L 1/1812 |
| 2019/0082425 A1 | 3/2019 | Li et al. | |
| 2019/0182850 A1* | 6/2019 | Wang | H04W 72/0446 |
| 2019/0230545 A1 | 7/2019 | Liou et al. | |
| 2019/0239093 A1* | 8/2019 | Zhang | H04L 5/001 |
| 2019/0260532 A1 | 8/2019 | Manolakos et al. | |
| 2019/0281588 A1* | 9/2019 | Zhang | H04B 7/0617 |
| 2019/0306850 A1* | 10/2019 | Zhang | H04B 7/0626 |
| 2020/0092814 A1* | 3/2020 | Zhou | H04W 52/0235 |
| 2020/0107353 A1* | 4/2020 | Jung | H04L 5/0053 |
| 2020/0128546 A1* | 4/2020 | Shi | H04L 5/0053 |
| 2020/0196383 A1* | 6/2020 | Tsai | H04L 1/1614 |
| 2020/0229161 A1* | 7/2020 | Raghavan | H04W 24/10 |
| 2020/0351039 A1* | 11/2020 | Zhou | H04L 5/0098 |
| 2020/0351069 A1* | 11/2020 | Grant | H04L 5/0092 |
| 2021/0067979 A1* | 3/2021 | Rahman | H04L 5/0023 |
| 2021/0091900 A1* | 3/2021 | Zhang | H04W 72/20 |
| 2021/0153209 A1* | 5/2021 | Guan | H04W 72/0453 |
| 2021/0306867 A1* | 9/2021 | Hamidi-Sepehr | H04W 72/046 |
| 2022/0191081 A1* | 6/2022 | Kim | H04B 1/7156 |
| 2022/0224487 A1* | 7/2022 | Nimbalker | H04L 5/0053 |

OTHER PUBLICATIONS

Huawei: "MAC CE Signalling Enhancement for TCI Indication of Single-PDCCH Based Multi-TRP Transmission", 3GPP TSG-RAN WG2 Meeting#107, R2-1910940, Prague, Czech Republic, Aug. 26-30, 2019, 3 Pages.

OPPO: "MAC CE Format to Indicate up to 2 TCI State per Indication", 3GPP TSG-RAN2 Meeting #107, R2-1910644, Prague, Czech Republic, Aug. 26-Aug. 30, 2019, 5 Pages.

QUALCOMMM Incorporated: "Enhanced TCI States Activation/Deactivation PDSCH MAC CE for Multi-TRP", 3GPP TSG-RAN WG2 Meeting #107, R2-1911375, Prague, Czech, Aug. 26-Aug. 30, 2019, pp. 1-3.

3rd Generation Partnership Project; Technical Specification Group Radio Access Network; NR; Medium Access Control (MAC) protocol specification (Release 15).

Final Report of 3GPP TSG RAN WG1 #98 v2.0.0 (Prague, Czech Rep, Aug. 26-30, 2019).

* cited by examiner

TRANSMISSION CONFIGURATION INDICATOR STATE ACTIVATION TECHNIQUES FOR CARRIER AGGREGATION

The present application for patent claims the benefit of U.S. Provisional Patent Application No. 62/900,587 by RYU et al., entitled "TRANSMISSION CONFIGURATION INDICATOR STATE ACTIVATION TECHNIQUES FOR CARRIER AGGREGATION," filed Sep. 15, 2019, assigned to the assignee hereof, and expressly incorporated by reference herein.

INTRODUCTION

The following relates to wireless communications, and specifically to communication configuration techniques for carrier aggregation in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a UE is described. The method may include receiving a medium access control-control element that indicates, for a plurality of component carriers configured for the UE, a set of active transmission configuration indicator states, determining that the set of one or more active transmission configuration indicator states is associated with a first component carrier and a second component carrier of the plurality of component carriers based on the received medium access control-control element, and communicating with a network entity using at least the first component carrier and the second component carrier based at least in part on the determining.

An apparatus for wireless communication at a UE is described. The apparatus may include a processor and memory coupled to the processor. The processor and memory may be configured to cause the apparatus to receive a medium access control-control element that indicates, for a plurality of component carriers configured for the UE, a set of active transmission configuration indicator states, to determine that the set of one or more active transmission configuration indicator states is associated with a first component carrier and a second component carrier of the plurality of component carriers based on the received medium access control-control element, and to communicate with a network entity using at least the first component carrier and the second component carrier based at least in part on the determining.

Another apparatus for wireless communication at a UE is described. The apparatus may include means for receiving a medium access control-control element that indicates, for a plurality of component carriers configured for the UE, a set of active transmission configuration indicator states, determining that the set of one or more active transmission configuration indicator states is associated with a first component carrier and a second component carrier of the plurality of component carriers based on the received medium access control-control element, and communicating with a network entity using at least the first component carrier and the second component carrier based at least in part on the determining.

A non-transitory computer-readable medium storing code for wireless communication at a UE is described. The code may include instructions executable by a processor to receive a medium access control-control element that indicates, for a plurality of component carriers configured for the UE, a set of active transmission configuration indicator states, determine that the set of one or more active transmission configuration indicator states is associated with a first component carrier and a second component carrier of the plurality of component carriers based on the received medium access control-control element, and communicate with a network entity using at least the first component carrier and the second component carrier based at least in part on the determining.

Some examples of the method, apparatuses, and non-transitory computer-readable medium described herein may further include operations, features, means, or instructions for receiving, in the medium access control-control element, a first plurality of entries that are each associated with a corresponding component carrier of the plurality of component carriers, each entry of the first plurality of entries providing a component carrier identification and a bandwidth part identification, and receiving, in the medium access control-control element, at least a second entry outside of the first plurality of entries that indicates one or more active transmission configuration indicator states for two or more of the plurality of component carriers or bandwidth parts.

Some examples of the method, apparatuses, and non-transitory computer-readable medium described herein may further include operations, features, means, or instructions for identifying two or more mappings of active transmission configuration indicator states for the first component carrier and the second component carrier, receiving, in the medium access control-control element, an activation command for a first mapping associated with a first set of active transmission configuration indicator states from the set of one or more active transmission configuration indicator states, and activating the first set of active transmission configuration indicator states for the first component carrier based on the mapping. In some examples of the method, apparatuses, and non-transitory computer-readable medium described herein, the activation command for the first set of active transmission configuration indicator states indicates one or more bandwidth part identifications, and an identification of the first set of active transmission configuration indicator states. In some examples of the method, apparatuses, and non-transitory computer-readable medium described herein, the mapping may be received from the base station in radio resource control signaling.

In some examples of the method, apparatuses, and non-transitory computer-readable medium described herein, each of the plurality of component carriers have an associated set of transmission configuration indicator state identifications, and a same transmission configuration indicator state identification for each of the plurality of component carriers in a millimeter wave frequency band have the same spatial quasi-colocation parameters. In some examples of the method, apparatuses, and non-transitory computer-readable medium described herein, each of the activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

A method of wireless communication at a base station is described. The method may include identifying a medium access control-control element that indicates, for a plurality of component carriers configured for a UE, a set of one or more active transmission configuration indicator states, determining that a first component carrier and a second component carrier of the plurality of component carriers is associated with the set of one or more active transmission configuration indicator states based at least in part on the identified medium access control-control element, transmitting the medium access control-control element to the UE, and communicating with the UE using at least the first component carrier and the second component carrier based on the determining.

An apparatus for wireless communication at a base station is described. The apparatus may include a processor and memory coupled to the processor. The processor and memory may be configured to cause the apparatus to identify a medium access control-control element that indicates, for a plurality of component carriers configured for a UE, a set of one or more active transmission configuration indicator states, to determine that a first component carrier and a second component carrier of the plurality of component carriers is associated with the set of one or more active transmission configuration indicator states based at least in part on the identified medium access control-control element, to transmit the medium access control-control element to the UE, and to communicate with the UE using at least the first component carrier and the second component carrier based on the determining.

Another apparatus for wireless communication at a base station is described. The apparatus may include means for identifying a medium access control-control element that indicates, for a plurality of component carriers configured for a UE, a set of one or more active transmission configuration indicator states, determining that a first component carrier and a second component carrier of the plurality of component carriers is associated with the set of one or more active transmission configuration indicator states based at least in part on the identified medium access control-control element, transmitting the medium access control-control element to the UE, and communicating with the UE using at least the first component carrier and the second component carrier based on the determining.

A non-transitory computer-readable medium storing code for wireless communication at a base station is described. The code may include instructions executable by a processor to identify a medium access control-control element that indicates, for a plurality of component carriers configured for a UE, a set of one or more active transmission configuration indicator states, determine that a first component carrier and a second component carrier of the plurality of component carriers is associated with the set of one or more active transmission configuration indicator states based at least in part on the identified medium access control-control element, transmit the medium access control-control element to the UE, and communicate with the UE using at least the first component carrier and the second component carrier based on the determining.

Some examples of the method, apparatuses, and non-transitory computer-readable medium described herein may further include operations, features, means, or instructions for transmitting, in the medium access control-control element, a first plurality of entries that are each associated with a corresponding component carrier of the plurality of component carriers, each entry of the first plurality of entries providing a component carrier identification and a bandwidth part identification, and transmitting, in the medium access control-control element, at least a second entry outside of the first plurality of entries that indicates one or more active transmission configuration indicator states for two or more of the plurality of component carriers or bandwidth parts.

Some examples of the method, apparatuses, and non-transitory computer-readable medium described herein may further include operations, features, means, or instructions for identifying two or more mappings of active transmission configuration indicator states for the first component carrier and the second component carrier, and transmitting, in the medium access control-control element, an activation command for a first mapping associated with a first set of active transmission configuration indicator states from the set of one or more active transmission configuration indicator states, and where the second set of active transmission configuration indicator states for the second component carrier may be activated based on a second mapping provided in the medium access control-control element. In some examples of the method, apparatuses, and non-transitory computer-readable medium described herein, the activation command for the first set of active transmission configuration indicator states indicates one or more bandwidth part identifications, and an identification of the first mapping. In some examples of the method, apparatuses, and non-transitory computer-readable medium described herein, the mappings may be transmitted in radio resource control signaling.

In some examples of the method, apparatuses, and non-transitory computer-readable medium described herein, each of the plurality of component carriers have an associated set of transmission configuration indicator state identifications, and a same transmission configuration indicator state identification for each of the plurality of component carriers in a millimeter wave frequency band have the same spatial quasi-colocation parameters. In some examples of the method, apparatuses, and non-transitory computer-readable medium described herein, each of the plurality of activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

A method of wireless communication at a UE is described. The method may include receiving a medium access control-control element from a network entity that indicates, for a set of component carriers configured for the UE, two or more sets of active transmission configuration indicator states, determining a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and communicating with the network entity using at least the first component carrier and the second component carrier based on the determining.

An apparatus for wireless communication at a UE is described. The apparatus may include a processor and memory coupled to the processor. The processor and memory may be configured to cause the apparatus to receive a medium access control-control element from a network entity that indicates, for a set of component carriers configured for the UE, two or more sets of active transmission configuration indicator states, to determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and to communicate with the network entity using at least the first component carrier and the second component carrier based on the determining.

Another apparatus for wireless communication at a UE is described. The apparatus may include means for receiving a medium access control-control element from a network entity that indicates, for a set of component carriers configured for the UE, two or more sets of active transmission configuration indicator states, determining a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and communicating with the network entity using at least the first component carrier and the second component carrier based on the determining.

A non-transitory computer-readable medium storing code for wireless communication at a UE is described. The code may include instructions executable by a processor to receive a medium access control-control element from a network entity that indicates, for a set of component carriers configured for the UE, two or more sets of active transmission configuration indicator states, determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and communicate with the network entity using at least the first component carrier and the second component carrier based on the determining.

Some examples of the method, apparatuses, and non-transitory computer-readable medium described herein may further include operations, features, means, or instructions for receiving, in the medium access control-control element, a first plurality of entries that are each associated with a corresponding component carrier of the plurality of component carriers, each entry of the first plurality of entries providing a component carrier identification and a bandwidth part identification, and receiving, in the medium access control-control element, at least a second entry outside of the first plurality of entries that indicates one or more active transmission configuration indicator states for two or more of the plurality of component carriers or bandwidth parts.

Some examples of the method, apparatuses, and non-transitory computer-readable medium described herein may further include operations, features, means, or instructions for receiving, in the medium access control-control element, an activation command for the first component carrier, where the activation command includes a first bit that may be set to indicate that different sets of active transmission configuration indicator states may be activated for different component carriers of the set of component carriers. Some examples of the method, apparatuses, and non-transitory computer-readable medium described herein may further include operations, features, means, or instructions for identifying, based on the activation command for the first component carrier, a first active transmission configuration indicator state, identifying a first reference signal ID associated with the first active transmission configuration indicator state, and activating one or more transmission configuration indicator states of at least the second component carrier that may be associated with the first reference signal ID. Some examples of the method, apparatuses, and non-transitory computer-readable medium described herein may further include operations, features, means, or instructions for activating transmission configuration indicator states that may be associated with the first reference signal ID of each remaining component carrier of the set of component carriers, and repeating the identifying and activating for one or more other active transmission configuration indicator states provided in the medium access control-control element that include the first bit that may be set to indicate that different sets of active transmission configuration indicator states may be activated.

Some examples of the method, apparatuses, and non-transitory computer-readable medium described herein may further include operations, features, means, or instructions for identifying two or more mappings of active transmission configuration indicator states for the first component carrier and the second component carrier, receiving, in the medium access control-control element, an activation command for a first mapping associated with a first set of active transmission configuration indicator states from the set of one or more active transmission configuration indicator states, and activating the first set of active transmission configuration indicator states for the first component carrier based on the mapping. In some examples of the method, apparatuses, and non-transitory computer-readable medium described herein, the activation command for the first set of active transmission configuration indicator states indicating one or more bandwidth part identifications, and an identification of the first set of active transmission configuration indicator states. In some examples of the method, apparatuses, and non-transitory computer-readable medium described herein, the mapping may be received from the base station in radio resource control signaling.

Some examples of the method, apparatuses, and non-transitory computer-readable medium described herein may further include operations, features, means, or instructions for receiving configuration information that indicates a subset of available transmission configuration indicator states, where the subset may be less than a total number of configurable transmission configuration indicator states, and where the medium access control-control element explicitly indicates which transmission configuration indicator states may be active for each component carrier. In some examples of the method, apparatuses, and non-transitory computer-readable medium described herein, the medium access control-control element includes a first set of bits associated with the first component carrier that indicate which transmission configuration indicator states of the subset of available transmission configuration indicator states may be in the first set of active transmission configuration indicator states, and the medium access control-control element includes a second set of bits associated with the second component carrier that indicate which transmission configuration indicator states of the subset of available transmission configuration indicator states may be in the second set of active transmission configuration indicator states.

In some examples of the method, apparatuses, and non-transitory computer-readable medium described herein, the medium access control-control element includes a first set of entries that may be each associated with a corresponding component carrier of the set of component carriers, and where each entry of the first set of entries provides a component carrier identification, a bandwidth part identification, and the medium access control-control element includes at least a second entry outside of the first set of entries that indicates one or more active transmission configuration indicator states for two or more of the set of component carriers or bandwidth parts.

In some examples of the method, apparatuses, and non-transitory computer-readable medium described herein, each of the plurality of component carriers have an associated set of transmission configuration indicator state identifications, and a same transmission configuration indicator state identification for each of the plurality of component carriers in a millimeter wave frequency band have the same spatial quasi-colocation parameters. In some examples of the method, apparatuses, and non-transitory computer-readable medium described herein, each of the activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

A method of wireless communication at a base station is described. The method may include determining, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, transmitting a medium access control-control element to the UE that indicates, for the set of component carriers, the first set of active transmission configuration indicator states and the second set of active transmission configuration indicator states, and communicating with the base station using at least the first component carrier and the second component carrier based on the determining.

An apparatus for wireless communication at a base station is described. The apparatus may include a processor and memory coupled to the processor. The processor and memory may be configured to cause the apparatus to determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, to transmit a medium access control-control element to the UE that indicates, for the set of component carriers, the first set of active transmission configuration indicator states and the second set of active transmission configuration indicator states, and to communicate with the base station using at least the first component carrier and the second component carrier based on the determining.

Another apparatus for wireless communication at a base station is described. The apparatus may include means for determining, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, transmitting a medium access control-control element to the UE that indicates, for the set of component carriers, the first set of active transmission configuration indicator states and the second set of active transmission configuration indicator states, and communicating with the base station using at least the first component carrier and the second component carrier based on the determining.

A non-transitory computer-readable medium storing code for wireless communication at a base station is described. The code may include instructions executable by a processor to determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, transmit a medium access control-control element to the UE that indicates, for the set of component carriers, the first set of active transmission configuration indicator states and the second set of active transmission configuration indicator states, and communicate with the base station using at least the first component carrier and the second component carrier based on the determining.

Some examples of the method, apparatuses, and non-transitory computer-readable medium described herein may further include operations, features, means, or instructions for transmitting, in the medium access control-control element, a first plurality of entries that are each associated with a corresponding component carrier of the plurality of component carriers, each entry of the first plurality of entries providing a component carrier identification and a bandwidth part identification, and transmitting, in the medium access control-control element, at least a second entry outside of the first plurality of entries that indicates one or more active transmission configuration indicator states for two or more of the plurality of component carriers or bandwidth parts.

Some examples of the method, apparatuses, and non-transitory computer-readable medium described herein may further include operations, features, means, or instructions for transmitting, in the medium access control-control element, an activation command for the first component carrier, where the activation command includes a first bit that may be set to indicate that different sets of active transmission configuration indicator states may be activated for different component carriers of the set of component carriers. In some examples of the method, apparatuses, and non-transitory computer-readable medium described herein, the activation command indicates a first active transmission configuration indicator state for the first component carrier having an associated first reference signal, and where one or more transmission configuration indicator states of at least the second component carrier that may be associated with the first reference signal may be activated.

Some examples of the method, apparatuses, and non-transitory computer-readable medium described herein may further include operations, features, means, or instructions for identifying two or more mappings of active transmission configuration indicator states for the first component carrier and the second component carrier, and transmitting, in the medium access control-control element, an activation command for a first mapping associated with a first set of active transmission configuration indicator states from the set of one or more active transmission configuration indicator states, and where the second set of active transmission configuration indicator states for the second component carrier may be activated based on a second mapping provided in the medium access control-control element. In some examples of the method, apparatuses, and non-transitory computer-readable medium described herein, the activation command for the first set of active transmission configuration indicator states indicating one or more bandwidth part identifications, and an identification of the first mapping. In some examples of the method, apparatuses, and non-transitory computer-readable medium described herein, the mappings may be transmitted in radio resource control signaling.

Some examples of the method, apparatuses, and non-transitory computer-readable medium described herein may further include operations, features, means, or instructions for transmitting configuration information to the UE that indicates a subset of available transmission configuration indicator states, where the subset may be less than a total number of configurable transmission configuration indicator states, and where the medium access control-control element explicitly indicates which transmission configuration indicator states may be active for each component carrier.

In some examples of the method, apparatuses, and non-transitory computer-readable medium described herein, the medium access control-control element includes a first set of bits associated with the first component carrier that indicate which transmission configuration indicator states of the subset of available transmission configuration indicator states may be in the first set of active transmission configuration indicator states, and the medium access control-control element includes a second set of bits associated with the second component carrier that indicate which transmission configuration indicator states of the subset of available transmission configuration indicator states may be in the second set of active transmission configuration indicator states.

In some examples of the method, apparatuses, and non-transitory computer-readable medium described herein, the medium access control-control element includes a first set of entries that may be each associated with a corresponding component carrier of the set of component carriers, and where each entry of the first set of entries provides a component carrier identification, a bandwidth part identification, and the medium access control-control element includes at least a second entry outside of the first set of entries that indicates one or more active transmission configuration indicator states for two or more of the set of component carriers or bandwidth parts.

In some examples of the method, apparatuses, and non-transitory computer-readable medium described herein, each of the plurality of component carriers have an associated set of transmission configuration indicator state identifications, and a same transmission configuration indicator state identification for each of the plurality of component carriers in a millimeter wave frequency band have the same spatial quasi-colocation parameters. In some examples of the method, apparatuses, and non-transitory computer-readable medium described herein, each of the plurality of activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

DETAILED DESCRIPTION

Figure 1:
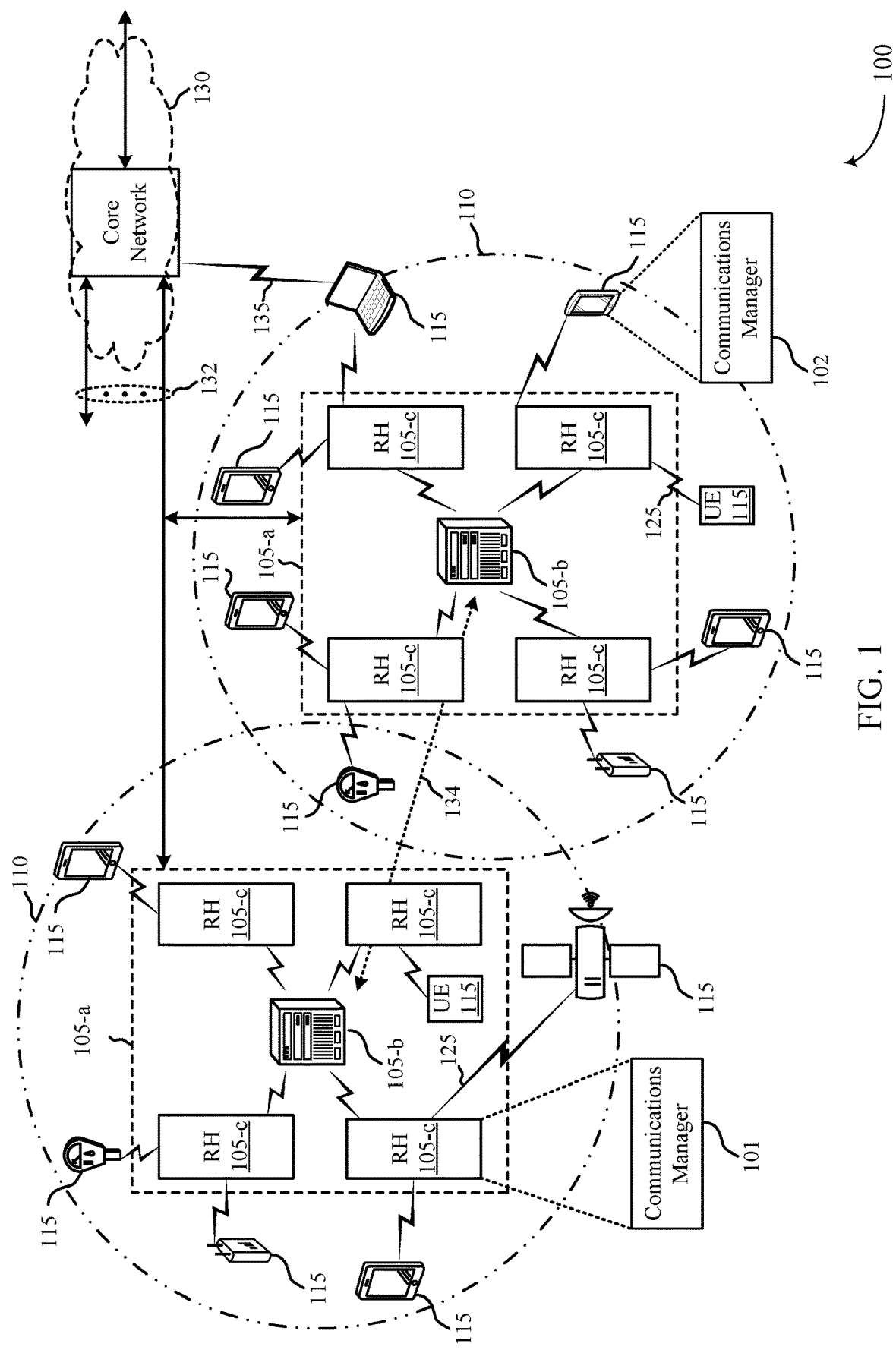
FIG. 1 illustrates an example of a system for wireless communications that supports transmission configuration indicator state activation techniques for carrier aggregation in accordance with aspects of the present disclosure.

A wireless communications system, such as a New Radio (NR) system, may support carrier aggregation using multiple component carrier (CCs). In some cases, one or more CCs may be divided into bandwidth parts (BWPs), and one BWP may be active for communications using a CC. In an example, a communication link in the system may support transmissions using multiple CCs (e.g., up to 16 uplink CCs and up to 16 downlink CCs). In some systems, one medium access control (MAC) control element (MAC-CE) may be used to configure two or more CCs with two or more different sets of active transmission configuration indicator (TCI) states.

Each CC may be uniquely identified and configured for physical channel and reference signal transmissions. For example, a beam selection may be indicated to a UE via a MAC-CE for each downlink and uplink CC. The configuration of each CC may lead to increased signaling overhead in the wireless system.

When a UE is configured with many CCs, a relatively large number of MAC-CEs (e.g., up to 16 MAC-CEs, one for each of the up to 16 CCs) may be used to select different TCI state identifiers (ID) in every CC (e.g., in downlink NR-NR carrier aggregation). The use of this number of MAC-CEs may lead to an increase in signaling overhead between the UE and the base station. In order to reduce the number of MAC-CEs used for conveying active sets of TCI states in each CC configured for communications between a base station and UE, various aspects as discussed herein provide a single MAC-CE command that may be used to activate two or more different sets of active TCI states for a number of CCs/BWPs for which the TCI states are active (e.g., for multiple CCs/BWPs). For example, a first set of activated TCI states may be selected to be associated with a first group of one or more CCs, and a second set of activated TCI states may be selected to be associated with a second group of one or more CCs.

In some cases, the single MAC-CE may be used to activate different sets of active TCI states for data communications (e.g., a physical downlink shared channel (PDSCH) or a physical uplink shared channel (PUSCH)) in groups of different BWPs or CCs. This is in contrast to the use of multiple MAC-CEs, where each MAC-CE is used to select the sets of active TCI states in the active BWP of a corresponding individual CC (e.g., in downlink NR-NR carrier aggregation), which may result in increased signaling overhead between UE and base station. Techniques discussed herein allow for a reduced number of MAC-CEs used for conveying the set of active TCI states for multiple active BWPs in a corresponding multiple CCs that are spatially quasi-co-located (QCLed). In some cases, a single MAC-CE command may be used to select multiple sets of active TCI states for PDSCHs that may be applied to a group of BWPs/CCs. For example, a MAC-CE may include a number of octets that may be used to activate different CCs. A reserved bit in each octet may indicate whether TCI states associated with the activated CC/BWP are to be applied to other CCs/BWPs. For example, if a reserved bit in an octet is set to zero, the TCI states associated with the indicated CC/BWP may not be applied to other CCs/BWPs. However, if the reserved bit is set to one, then one or more TCI states of the CC/BWP indicated in the octet may be applied to one or more other CCs/BWPs. Such reduced signaling may provide for enhanced system efficiency through a reduction in signaling, reduced power consumption, and accelerated signaling.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to communication configuration for multiple CCs.

FIG. 1 illustrates an example of a wireless communications system 100 that supports transmission configuration indicator state activation techniques for carrier aggregation in accordance with aspects of the present disclosure. The wireless communications system 100 includes network devices 105, UEs 115, and a core network 130. In some examples, the wireless communications system 100 may be a LTE network, a LTE-A network, a LTE-A Pro network, or a NR network. In some cases, wireless communications system 100 may support enhanced broadband communications, ultra-reliable (e.g., mission critical) communications, low latency communications, or communications with low-cost and low-complexity devices. Wireless communications system 100 may support signaling between network devices 105 such as base stations, and UEs 115 for configuration and management of repeater 140 control channel monitoring.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-*b* may also additionally or alternatively communicate with a number of UEs 115 through a number of other network devices 105-*c*, where network device 105-*c* may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network devices 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a repeater 140 may be a MTC or IoT device that is controlled by a network device 105 or UE 115 via a low bandwidth (low-band) or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a network device 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a network device 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within a synchronization signal block (SSB) on respective directional beams, where one or more SSBs may be included within a synchronization signal burst.

One or more of the network devices 105 may include a communications manager 101, which may configure one or more UEs 115 for communications using carrier aggregation via two or more CCs. In some cases, two or more different sets of active TCI states may be configured for or be associated with the two or more CCs, and an indication of the different sets of TCI states may be provided in a single MAC-CE. In some examples, the communications manager 101 may determine the CCs for communications and the associated sets of TCI states to be activated, and transmit control information (e.g., the single MAC-CE) to the UE 115 that indicates the activated CCs and associated sets of TCI states.

In other examples, a communications manager 102 may receive configuration information for multiple CCs. In some cases, a network device 105 may transmit an indication of different sets of TCI states for the configured CCs in a single MAC-CE. In some examples, the communications manager 102 may determine the CCs for communications and the associated sets of TCI states to be activated, based on the control information (e.g., the single MAC-CE) and communicate with the network device 105 using the activated CCs and associated sets of TCI states.

Figure 2:
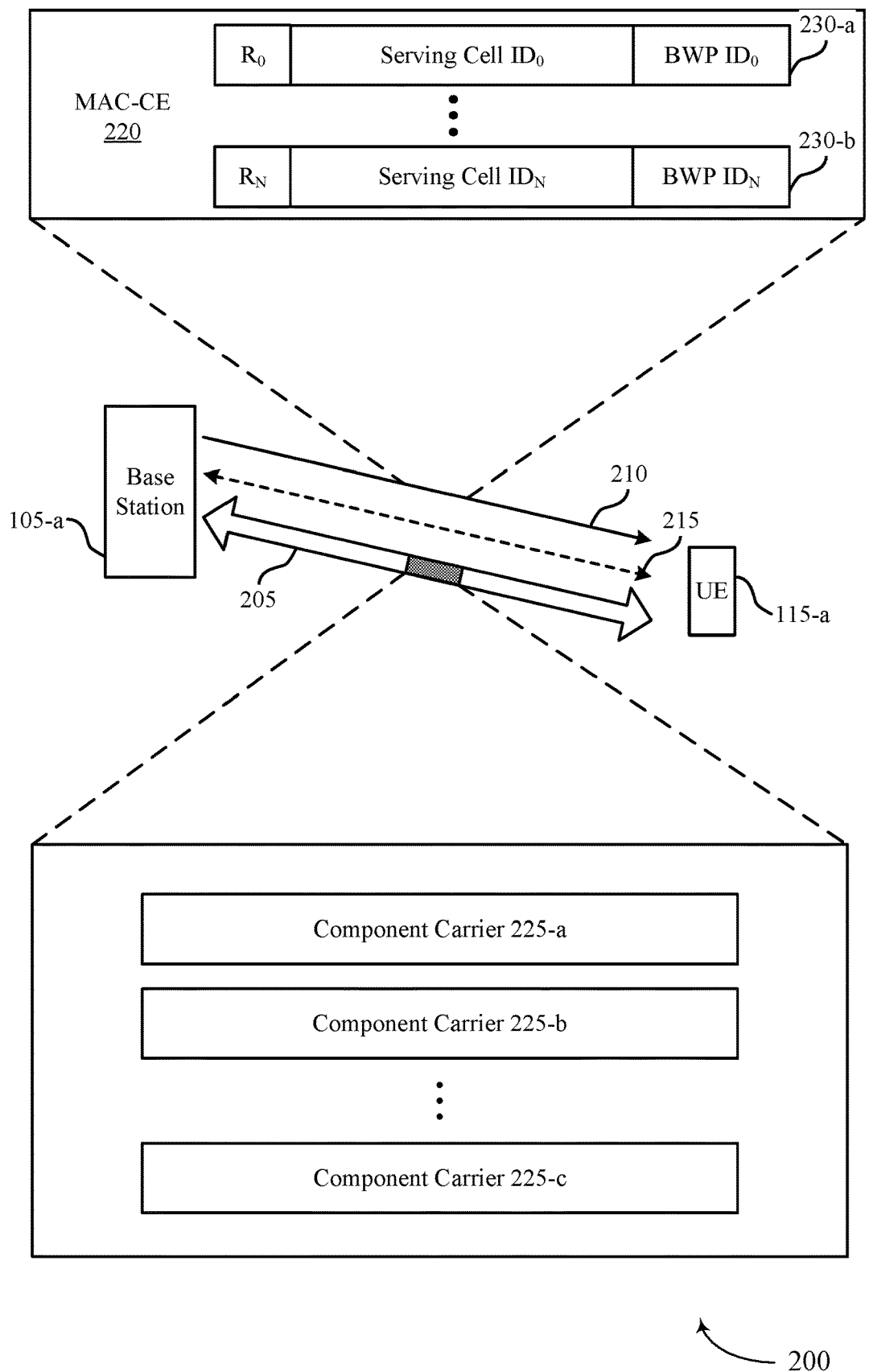
FIG. 2 illustrates an example of a wireless communications system that supports transmission configuration indicator state activation techniques for carrier aggregation in accordance with aspects of the present disclosure.

FIG. 2 illustrates an example of a wireless communications system 200 that supports transmission configuration indicator state activation techniques for carrier aggregation in accordance with aspects of the present disclosure. In some examples, wireless communications system 200 may implement aspects of wireless communications system 100. For example, wireless communications system 200 includes base station 105-*a* and UE 115-*a*, which may be examples of the corresponding devices described with reference to FIG. 1.

Wireless communications system 200 may support carrier aggregation using multiple CCs 225. UE 115-*a* and base station 105-*a* may communicate over links 205, 210, and optionally link 215. For example, link 205 may support communication using CCs 225-*a*, 225-*b*, and 225-*c*, and additional CCs 225 may be used on link 205. For instance, up to 16 uplink CCs 225 and up to 16 downlink CCs 225 may be used for carrier aggregation on link 205. In some systems, one MAC-CE 220 may be used to activate different sets of TCI states in different CCs 225 or serving cells.

In some cases, multiple BWPs may be defined for one or more of the CCs 225, and may be used for transmitting/receiving control/data for a UE 115-*a*. In some cases, one BWP can be active per CC 225, and up to 4 BWP can be defined per CC 225. Each active BWP may have multiple TCI states to be managed (e.g., activated/deactivated). TCI states may be used to inform the UE 115-*a* about how downlink signals are transmitted, and information may be provided in terms of association, as in physical downlink shared channel (PDSCH) was transmitted using the same beam parameters (e.g., QCL type D) as some other downlink reference signal. Such association information may allow the UE 115-*a* to use the correct receive beam to receive PDSCH/PDCCH. In some cases, up to 128 TCI states can be configured for a UE 115-*a*, but only a subset of them are active (e.g., activated by MAC-CE), with the remaining being inactive. TCI state activation/deactivation may be configured per BWP. In some cases, for PDSCH reception, associated downlink control information (DCI) may indicate to the UE 115-*a* which TCI state among the set of activated TCI states to apply.

Various existing techniques may provide that when CCs 225 share the same analog beam in the same frequency band (e.g., are spatially QCLed), up to 16 MAC-CEs 220 may be used to select same TCI state ID in every CC 225 (e.g., in downlink NR-NR carrier aggregation). A same TCI state ID may be used in such CCs 225 due to the spatial QCL. However, in some cases it may be desirable for different CCs 225 to have different TCI states, even in cases where such CCs are in a same frequency band. For example, if a first CC 225-*a* has a relatively light traffic load, relatively few TCI states may be sufficient to provide enough beams for communications on the first CC 225-*a*. Continuing with this example, if a second CC 225-*b* has a relatively heavy traffic load, the relatively few TCI states of the first CC 225-*a* may be insufficient, and it may be desirable to have additional available TCI states to provide additional beams from which a communications beam may be selected in order to avoid interfering beams of other devices. Traditionally, in order to configure such different sets of active TCI states, multiple MAC-CEs would need to be transmitted to convey different active sets of TCI states for both CCs 225. In order to reduce the number of MAC-CEs 220 for conveying different sets of active TCI states for different CCs 225, various aspects of the present disclosure provide techniques to convey different sets of active TCI states within a same MAC-CE 220. In some cases, a single MAC-CE 220 may be used to activate two or more CCs 225 with different sets of active TCI states at each CC 225.

For example, a first set of activated TCI states may be selected (e.g., by base station 105-*a*) for or be associated with the first CC 225-*a*, and a second set of activated TCI states may be selected for or be associated with the second CC 225-*b*. While first and second CCs 225 and TCI states are discussed in various examples herein, the techniques provided herein may be used on any number of CCs or BWPs. In some cases, the MAC-CE 220 may include a number of octets 230 that may be used to activate different CCs 225. For example, each octet 230 may indicate a serving cell ID and a BWP ID that is activated. In some cases, a reserved bit (R) in each octet 230 may indicate whether TCI states associated with the activated CC/BWP are to be applied to other CCs/BWPs. For example, if a reserved bit in first octet 230-*a* is set to zero, the TCI states associated with the indicated CC/BWP may not be applied to other CCs/BWPs. However, if the reserved bit is set to one, then one or more TCI states of the CC/BWP indicated in the first octet 230-*a* may be applied to one or more other CCs/BWPs. In some cases, a TCI state of the CC/BWP indicated in the first octet 230-*a* may be associated with a first reference signal (e.g., beamforming parameters, such as QCL-TypeD parameters, for receiving the first reference signal may be used for data communications via the indicated CC/BWP), and for each remaining CC 225 in a group of CC (e.g., CCs in a same frequency band) may have a TCI state activated that has the same first reference signal (i.e., TCI states with same QCL-TypeD reference signals are activated in other CCs). Thus, corresponding activated TCI states of other CCs 225 may have different TCI state IDs, but may be activated based on the QCL-TypeD parameters. In some examples, corresponding activated TCI states of other CCs 225 may have different TCI state IDs and have different QCL-TypeD parameters.

In some cases, an indication of the TCI state ID may be implicit and may be based on MAC-CE 220. An implicit MAC-CE 220 indication may be transmitted by base station 105-*a* and may include a MAC-CE 220 that identifies a TCI state ID for a CORESET ID of a specified CC 225 or of multiple CCs 225. UE 115-*a* may apply the indicated TCI state ID to the identified CC 225. UE 115-*a* may also identify other CCs 225 that are configured with the same TCI states as the CC 225 indicated in the MAC-CE 220, and the UE 115-*a* may also apply the indicated TCI state ID to the additional CCs 225 having the same TCI state even though the additional CCs are not explicitly specified in the MAC-CE 220. The TCI state ID may be applied to the additional CCs 225 at least for PDCCH communications.

According to some aspects, an indication of the TCI state ID may be explicitly transmitted from the base station 105-*a* to UE 115-*a*. For instance, a MAC-CE 220 may be formatted to include CORESET TCI selection using a list of the set of CCs to which the indicated TCI state ID is to be applied. UE 115-*a* may receive the list of CC IDs in MAC-CE 220 and apply the indicated TCI state ID to the CCs 225 indicated by the list. In another example, the set of CCs 225 sharing same MAC-CE 220 command is indicated outside or separate from the MAC-CE 220. For example, link 215 may be used by base station 105-*a* for transmission of RRC signaling or a separate control message (e.g., a separate MAC-CE) that indicates the set of CCs to share the MAC-CE 220.

UE 115-*a* may then receive downlink control information (e.g., via PDCCH) from base station 105-*a* in accordance with the indicated TCI state ID (e.g., using the same configured beam or other transmission parameters) for one or more CCs 225 after applying the TCI state ID indicated in the MAC-CE 220 or via link 215. In some cases, different formats of the MAC-CE 220 may be used to indicate activated sets of TCI states and activated BWPs/CCs. In some cases, the MAC-CE 220 may indicate a number of activated BWPs/CCs, and may also indicate activated TCI states for multiple BWPs/CCs. Various examples of different MAC-CE 220 formats are discussed herein, although the examples provided herein are not considered to be limiting and other MAC-CE formats that activate different sets of TCI states for different BWPs/CCs are within the scope of the present disclosure.

In some cases, a MAC-CE may activate same set of TCI state IDs for all active BWPs on CCs in same cell group and in same band on frequency range 2 (FR2) (i.e., a millimeter wave frequency band). In such cases, when operating in this mode, the UE 115-*a* may expect the same QCL-TypeD reference signal is configured for same TCI state ID for all BWPs on CCs in same cell group and in same band. In such cases, for activation, a MAC-CE received on any active BWP in a band or cell group(s) with indicated activated TCI state IDs may be applied to every active BWP on CCs in that cell group and in that band.

In other cases, communications may use frequency range 1 (FR1) (i.e., a sub-6 GHz frequency band), and a MAC-CE 220 may activate one set of TCI state IDs (including both QCL Type-A and Type-D reference signals). In such cases, QCL TypeD may provide spatial receive parameters, and QCL-TypeA may provide doppler and delay receive parameters. In such cases, the set of TCI state IDs for an active BWP of the CC indicated by the MAC-CE may be applied to all active BWPs on CCs in same cell group and in same band (e.g., QCL-TypeA reference signals that are applied to each CC/BWP is that corresponding to the same resource ID(s) indicated by the TCI state IDs).

Figure 3:
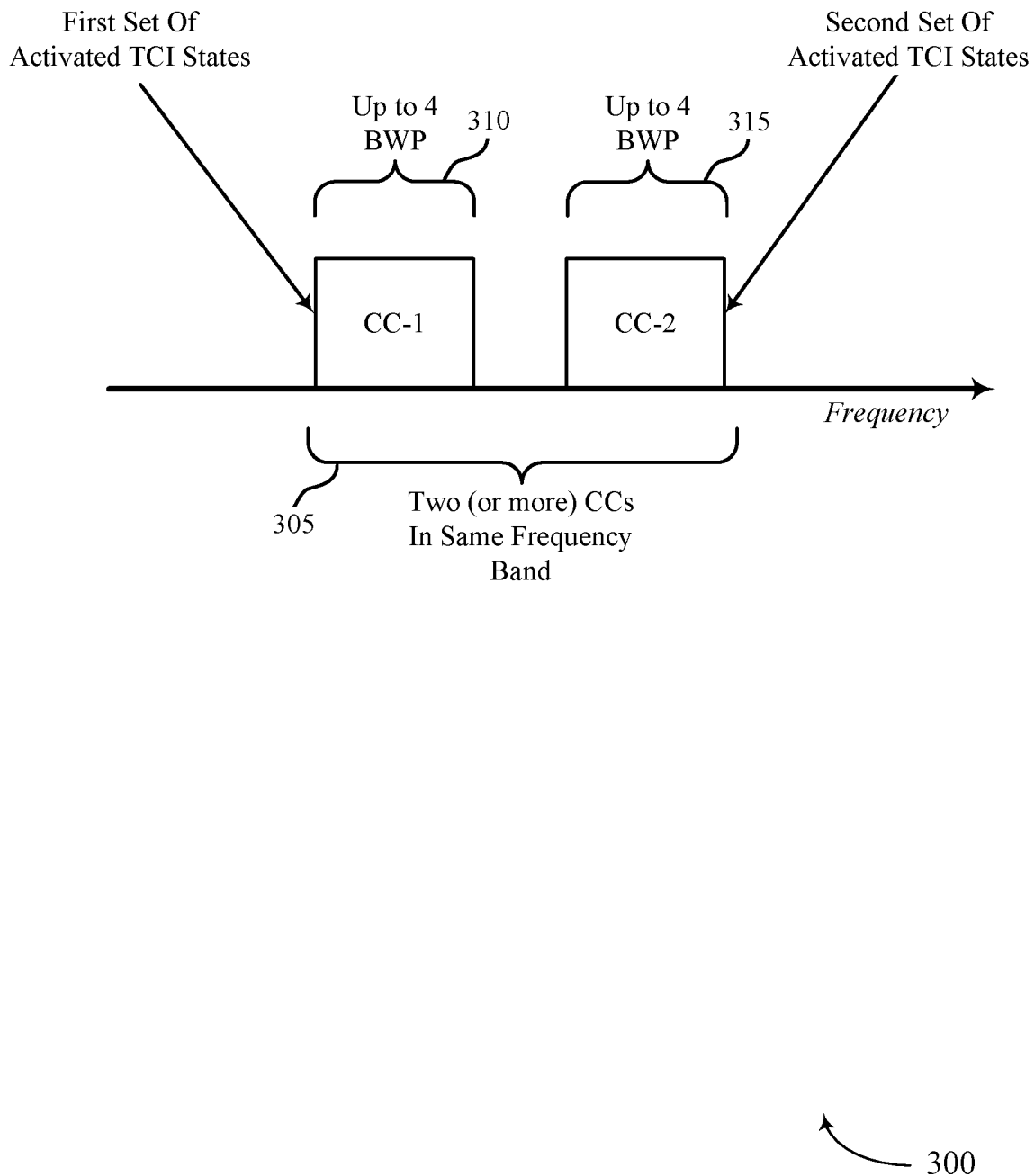
FIG. 3 illustrates an example of a component carrier configuration that supports transmission configuration indicator state activation techniques for carrier aggregation in accordance with aspects of the present disclosure.

FIG. 3 illustrates an example of a component carrier configuration 300 that supports transmission configuration indicator state activation techniques for carrier aggregation in accordance with aspects of the present disclosure. In some examples, component carrier configuration 300 may implement aspects of wireless communications system 100. In this example, two or more CCs 305 may be configured in a same frequency band, including a first CC 310 and a second CC 315. As indicated with respect to FIG. 2, each CC 305 may be configured with up to four BWPs.

In this example, the CCs 305 may be in a same 28 GHz band (i.e., FR2), and their channel properties are very similar. That is, a UE can receive one signal in the first CC 310 using the same beam as another signal in the second CC 315. Thus, it may be relatively efficient (i.e., less overhead) to change the TCI states for both CC's 305 at the same time. Further, as discussed with respect to FIG. 2, in some cases it may be desirable to have different sets of active TCI states for the first CC 310 and the second CC 315. For example, additional available beams for communications using the second CC 315 may be desirable in order to avoid interference in a relatively congested channel in which multiple different devices may use the same frequency band, and different beams may provide directional communications to avoid one another. Thus, in this example, the first CC 310, and at least one activated BWP of the first CC 310, may have a first set of activated TCI states. Further, the second CC 315, and at least one activated BWP of the second CC 315, may have a second set of activated TCI states that is different than the first set of activated TCI states. Various techniques discussed herein provide for activating such different sets of TCI states using a single MAC-CE.

Figure 4:
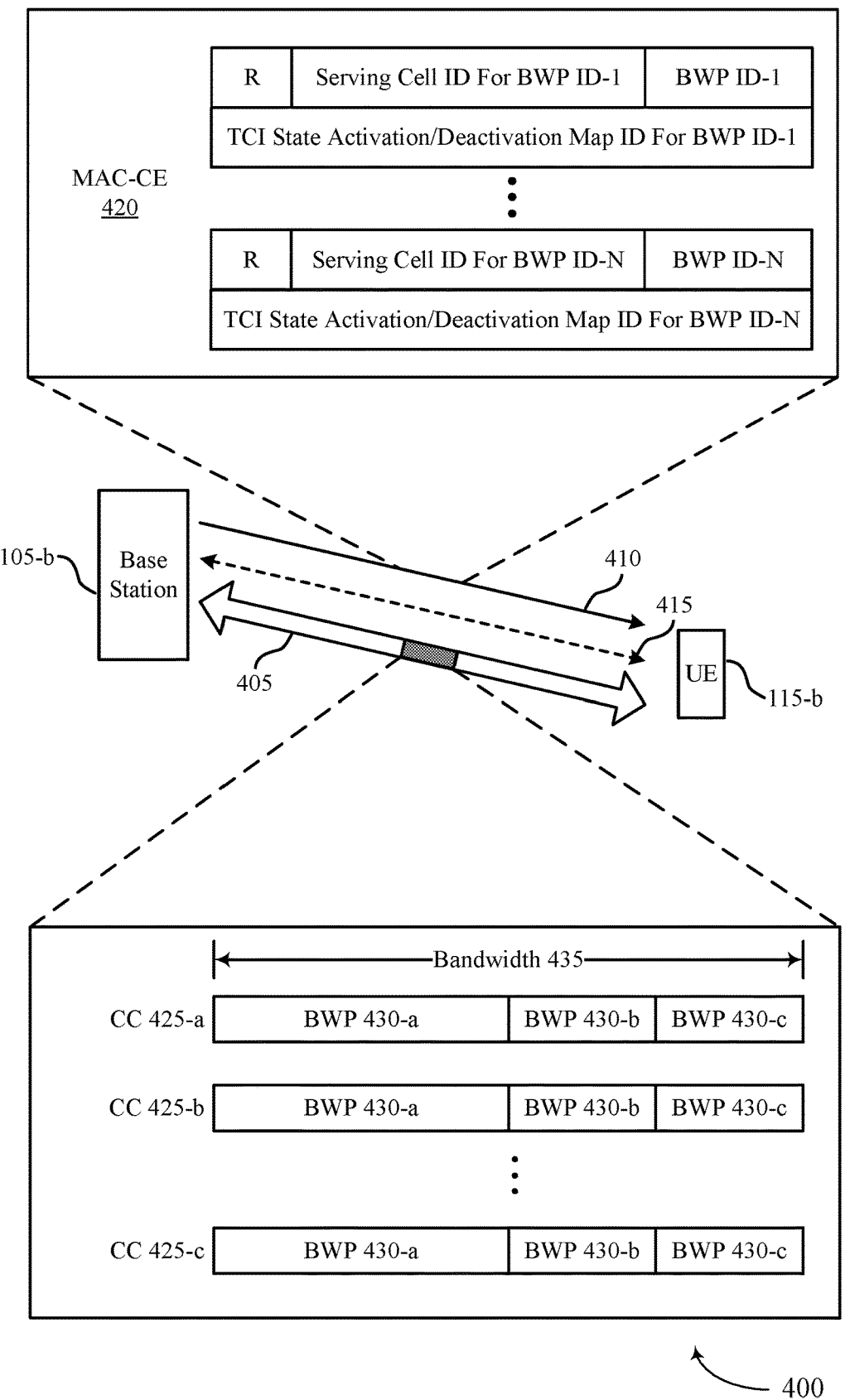
FIG. 4 illustrates another example of a wireless communications system that supports transmission configuration indicator state activation techniques for carrier aggregation in accordance with aspects of the present disclosure.

FIG. 4 illustrates another example of a wireless communications system 400 that supports transmission configuration indicator state activation techniques for carrier aggregation in accordance with aspects of the present disclosure. In some examples, wireless communications system 400 may implement aspects of wireless communications system 100. For example, wireless communications system 400 includes base station 105-*b* and UE 115-*b*, which may be examples of the corresponding devices described with reference to FIGS. 1 and 2.

Wireless communications system 400 may support carrier aggregation using multiple CCs 425. UE 115-*b* and base station 105-*b* may communicate over links 405, 410, and optionally link 415. For example, link 405 may support communication using CCs 425-*a*, 425-*b*, and 425-*c*, and additional CCs 425 may also be supported on link 405 (e.g., 16 uplink CCs 425 or 16 downlink CCs 425 may be used for carrier aggregation on link 405). In some systems, a MAC-CE 420 may be used to change the set of active TCI states for data communications (e.g., PDSCH, PUSCH) in a BWP 430 of a CC 425 or serving cell. In order to reduce the number of MAC-CEs 420 used to convey the set of active TCI states for the same active BWP 430 in each CC 425 spatially QCLed, a single MAC-CE 420 may be used to select a set of active TCI states for PDSCH that may be applied to multiple BWP 430 CC 425 pairs (e.g., uplink and downlink pair of CCs 425).

In this example, a number of different sets of TCI states may be preconfigured according to a number of mappings of TCI states. For example, the base station 105-*b* may preconfigure a number of mappings of TCI states and transmit the mappings to the UE 115-*b* in RRC signaling over link 415. In one specific example, a first BWP 430-*a* may have two preconfigured activation/deactivation mappings, which include a first map that has active TCI states={1, 2, 3, 4}; and inactive TCI states={5, 6, 7, 8}. A second map may have active TCI states={5, 6, 7, 8}; and inactive TCI states={1, 2, 3, 4}. In such an example, the MAC-CE 420 may indicate which map to use for TCI state activation/deactivation, and includes CC or serving cell IDs, associated BWP IDs, and an ID of the TCI state activation/deactivation map for each BWP ID. The MAC-CE 420 of this example also includes a reserved bit (R) that may be reserved for future use.

Figure 5:
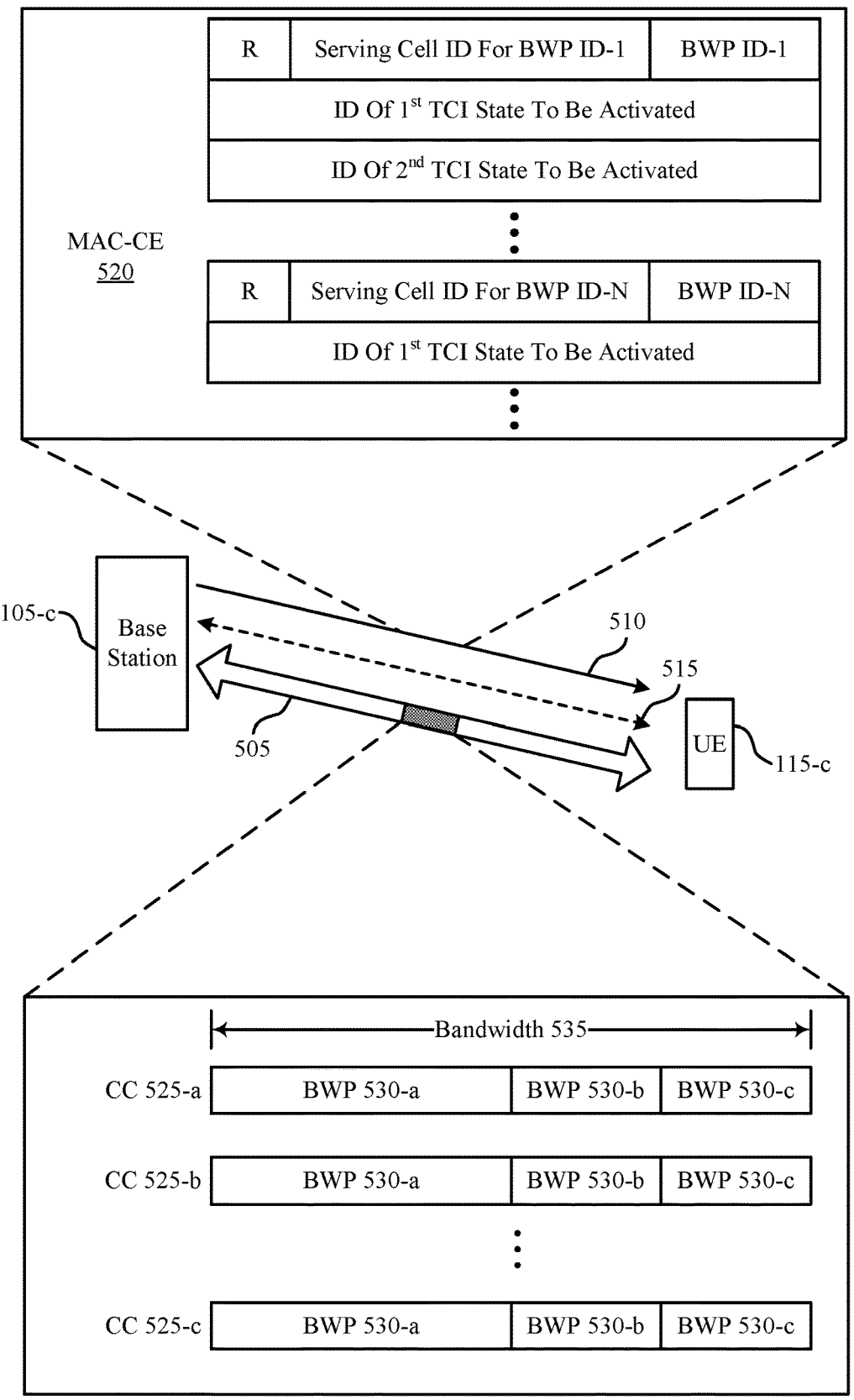
FIG. 5 illustrates another example of a wireless communications system that supports transmission configuration indicator state activation techniques for carrier aggregation in accordance with aspects of the present disclosure.

FIG. 5 illustrates another example of a wireless communications system 500 that supports transmission configuration indicator state activation techniques for carrier aggregation in accordance with aspects of the present disclosure. In some examples, wireless communications system 500 may implement aspects of wireless communications system 100. For example, wireless communications system 500 includes base station 105-*c* and UE 115-*c*, which may be examples of the corresponding devices described with reference to FIGS. 1, 2, and 4.

Wireless communications system 500 may support carrier aggregation using multiple CCs 525. UE 115-*c* and base station 105-*c* may communicate over links 505, 510, and optionally link 515 (e.g., for RRC signaling). For example, link 505 may support communication using CCs 525-*a*, 525-*c*, and 525-*c*, and additional CCs 525 may also be supported on link 505 (e.g., 16 uplink CCs 525 or 16 downlink CCs 525 may be used for carrier aggregation on link 505). In some systems, a MAC-CE 520 may be used to change the set of active TCI states for data communications (e.g., PDSCH, PUSCH) in a BWP 530 of a CC 525 or serving cell. In order to reduce the number of MAC-CEs 520 used to convey the set of active TCI states for the same active BWP 530 in each CC 525 spatially QCLed, a single MAC-CE 520 may be used to select a set of active TCI states for PDSCH that may be applied to multiple BWP 530 CC 525 pairs.

In this example, a relatively limited number of available TCI states may be activated at any one time. The remaining configured TCI states will be inactive. In some cases, an indication of the available TCI states may be provided via RRC signaling over link 515. In some cases, the number of available TCI states may be limited by a number of bits that can be used to signal which TCI states are activated. For example, MAC-CE 520 may include an identification of each TCI state to be activated for a serving cell or CC ID for a bandwidth part, and a bandwidth part ID. If n bits are used to indicate a TCI state ID to be activated, then up to $2^n$ TCI states can be configured. As indicated, in some cases the configured TCI states may be indicated to the UE 115-*c* via RRC signaling. A single MAC-CE 520 message may then explicitly indicate which TCI states are active, with the remaining TCI states being inactive. In some cases, a number of octets may be provided in the MAC-CE 520, and two or more TCI states may be indicated by a single octet if the n bits are sufficiently small. For example if 16 TCI states may be activated, the TCI state IDs may be identified using four bits, and two TCI state IDs may be provided in an octet of the MAC-CE 520. The MAC-CE 520 of this example also includes a reserved bit (R) that may be reserved for future use.

Figure 6:
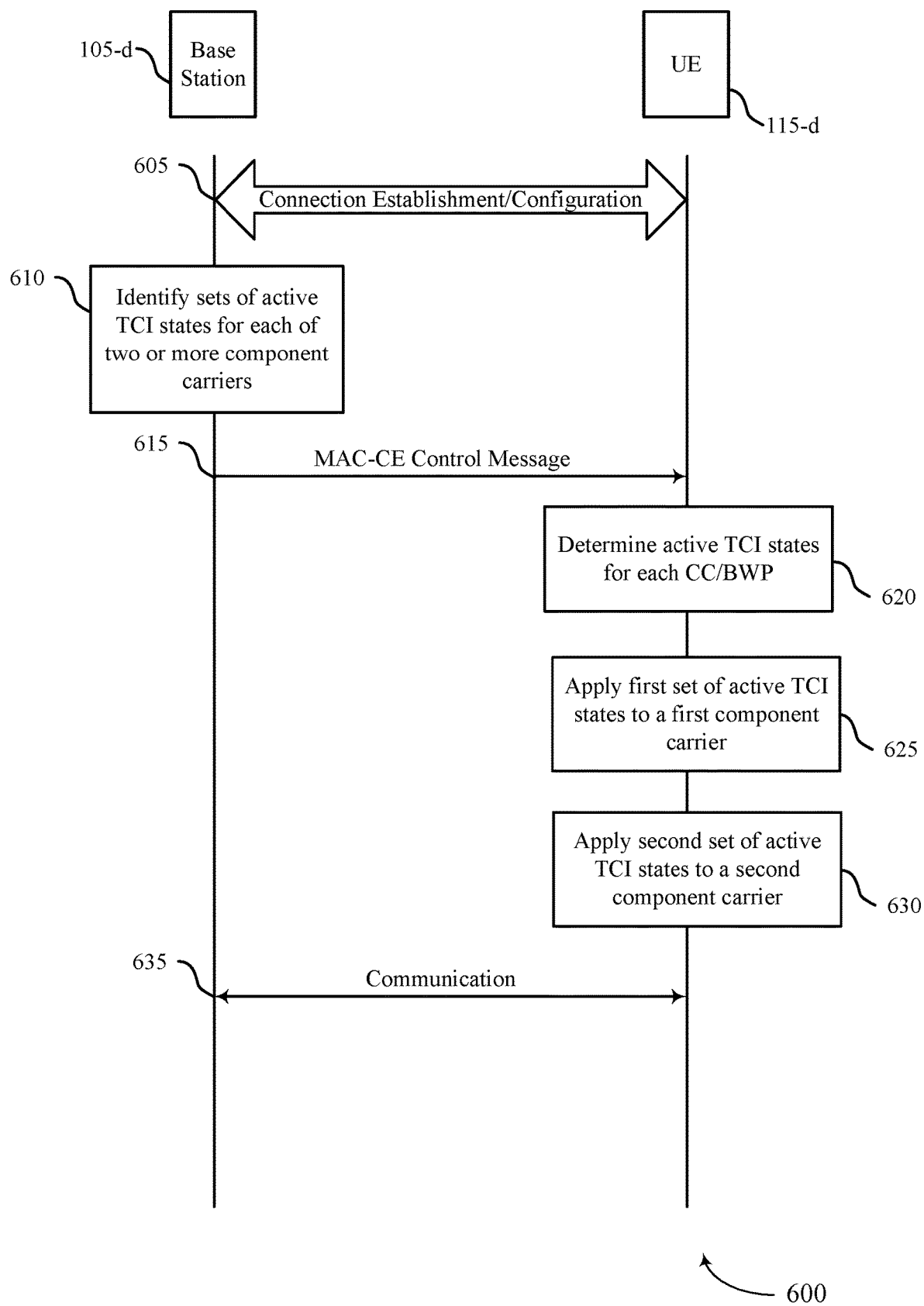
FIG. 6 illustrates an example of a process flow that supports transmission configuration indicator state activation techniques for carrier aggregation in accordance with aspects of the present disclosure.

FIG. 6 illustrates an example of a process flow 600 that supports transmission configuration indicator state activation techniques for carrier aggregation in accordance with aspects of the present disclosure. In some examples, process flow 600 may implement aspects of wireless communications system 100, 200, 400, or 500. Process flow 600 may include base station 105-*d* and UE 115-*d*, which may be examples of the corresponding devices described with reference to FIGS. 1 through 5.

At 605, the base station 105-*d* and UE 115-*d* may establish a connection. For example, a random access procedure and an associated RRC connection establishment procedure may be performed to establish a connection. In some cases, the connection may use carrier aggregation for communications over two or more CCs.

At 610, base station 105-*d* may identify two or more sets of active TCI states for each of the two or more CCs. In some cases, a first set of active TCI states may be identified for a first CC, and a second set of active TCI states may be identified for a second CC.

At 615, base station 105-*d* may transmit a control message (e.g., a single MAC-CE) to UE 115-*d*. The control message may indicate the identified active CCs (and/or BWPs), and the associated activated set of TCI states associated with each CC. In some cases, a MAC-CE may have a format such as discussed in the examples of FIG. 2, 4, or 5, and may provide an indication of the activated sets of TCI states using relatively little overhead while providing flexibility to the system to select a suitable TCI state for a particular CC.

At 620, UE 115-*d* may receive the control message and determine active TCI states for each CC/BWP. The determination of active TCI states may be made based on the information provided by a MAC-CE, such as discussed in the examples of FIG. 2, 4, or 5.

At 625, UE 115-*d* may apply a first set of active TCI states to a first CC based on the determination at 620.

Further, at 630, UE 115-*d* may apply a second set of active TCI states to a second CC based on the determination at 620.

At 635, UE 115-d may transmit to or receive communications from base station 105-d based on the determination at 620 and the applied sets of active TCI states.

Figure 7:
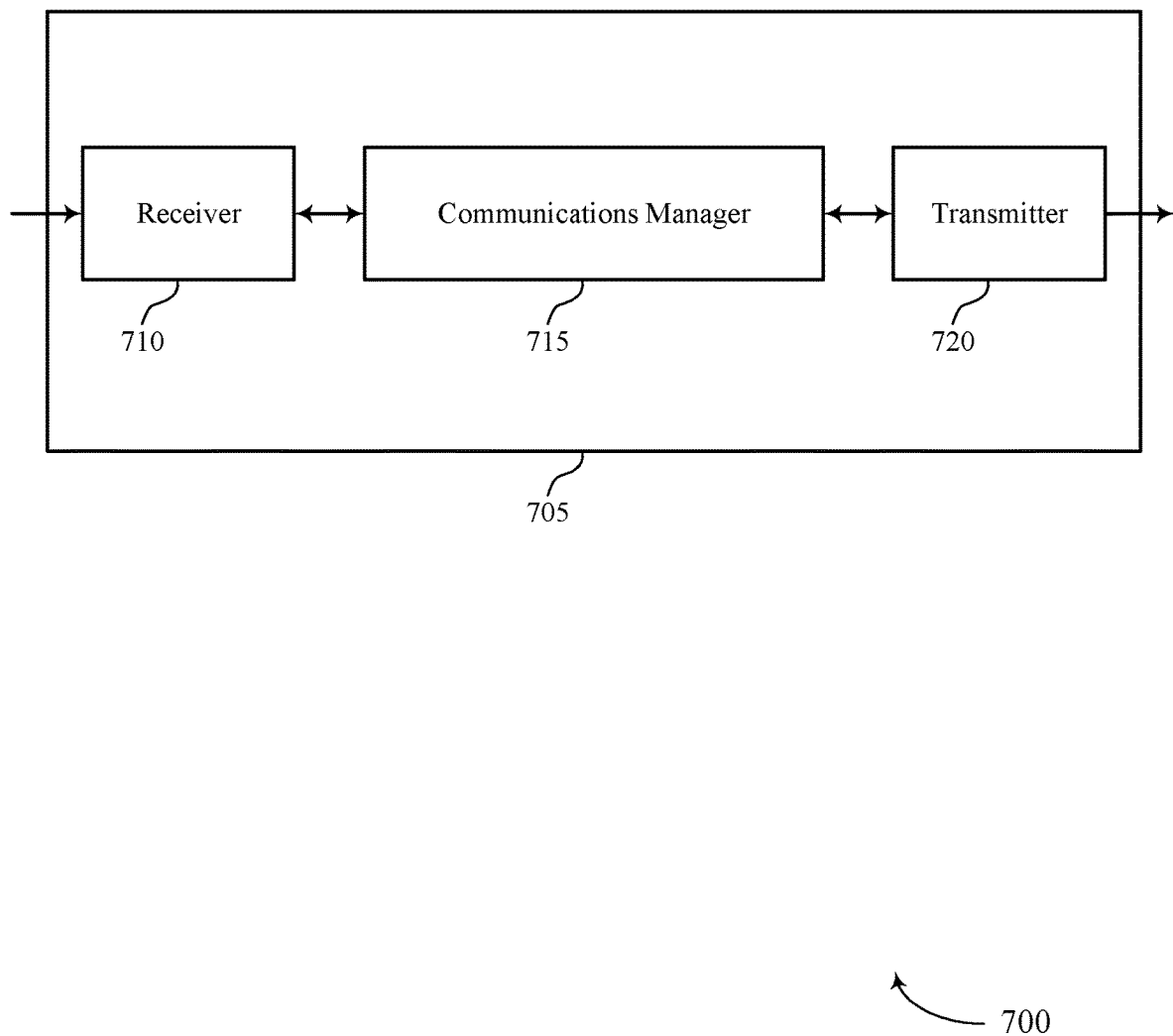
FIGS. 7 and 8 show block diagrams of devices that support transmission configuration indicator state activation techniques for carrier aggregation in accordance with aspects of the present disclosure.

FIG. 7 shows a block diagram 700 of a device 705 that supports transmission configuration indicator state activation techniques for carrier aggregation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission configuration indicator state activation techniques for carrier aggregation, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a medium access control-control element from a network entity that indicates, for a set of component carriers configured for the UE, two or more sets of active transmission configuration indicator states, determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and communicate with the network entity using at least the first component carrier and the second component carrier based on the determining. The communications manager 715 may be an example of aspects of the communications manager 1010 described herein.

The communications manager 715 may receive a medium access control-control element that indicates, for a plurality of component carriers configured for the UE, a set of one or more active transmission configuration indicator states, determine that the set of one or more active transmission configuration indicator states is associated with a first component carrier and a second component carrier of the plurality of component carriers based at least in part on the received medium access control-control element, and communicate with a network entity using at least the first component carrier and the second component carrier based at least in part on the determining The communications manager 715 may be an example of means for performing various aspects of transmission configuration indicator state activation techniques for carrier aggregation as described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In another implementation, the communications manager 715, or its sub-components, may be implemented in code (e.g., as communications management software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device.

In some examples, the communication manager 715 may be configured to perform various operations (e.g., receiving, determining, communicating) using or otherwise in cooperation with the receiver 710, the transmitter 720, or both.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential benefits. One implementation may allow a UE 115 to save power and increase battery life by reducing signaling through using a single MAC-CE command to select multiple sets of active TCI states for PDSCH's that may be applied to multiple BWPs/CCs. Another implementation may provide improved quality and reliability of service at the UE 115, as latency and the number of separate resources allocated to the UE 115 may be reduced.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
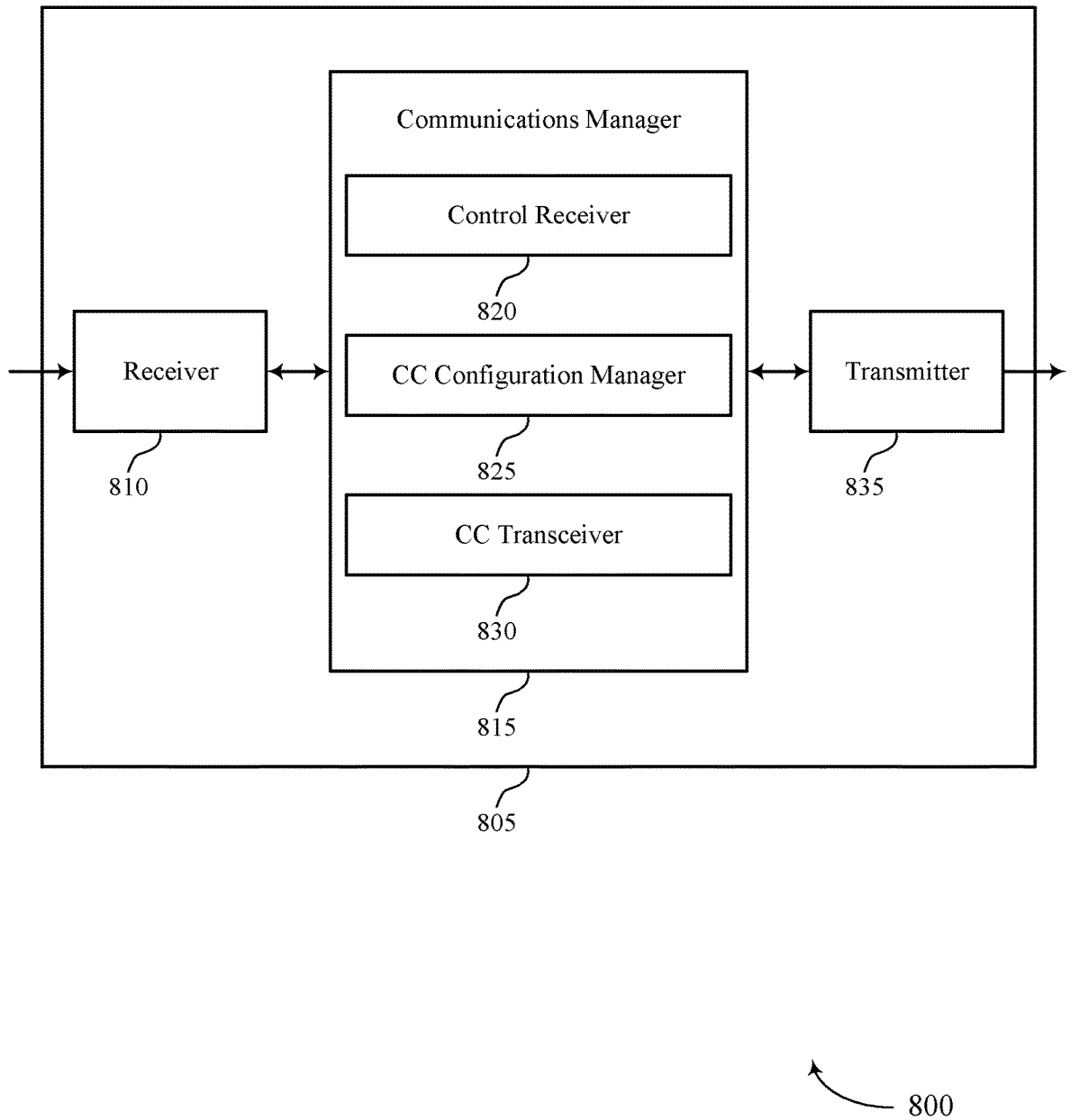

FIG. 8 shows a block diagram 800 of a device 805 that supports transmission configuration indicator state activation techniques for carrier aggregation in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to transmission configuration indicator state activation techniques for carrier aggregation, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control receiver 820, a CC configuration manager 825, and a CC transceiver 830. The communications manager 815 may be an example of aspects of the communications manager 1010 described herein.

The control receiver 820 may receive a medium access control-control element from a network entity that indicates, for a set of component carriers configured for the UE, two or more sets of active transmission configuration indicator states. In some examples, the control receiver 820 may receive, in the medium access control-control element, a first plurality of entries that are each associated with a corresponding component carrier of the plurality of component carriers, each entry of the first plurality of entries providing a component carrier identification and a bandwidth part identification, and receive, in the medium access control-control element, at least a second entry outside of the first plurality of entries that indicates one or more active transmission configuration indicator states for two or more of the plurality of component carriers or bandwidth parts.

The CC configuration manager 825 may determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states.

The CC transceiver 830 may communicate with the network entity using at least the first component carrier and the second component carrier based on the determining.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
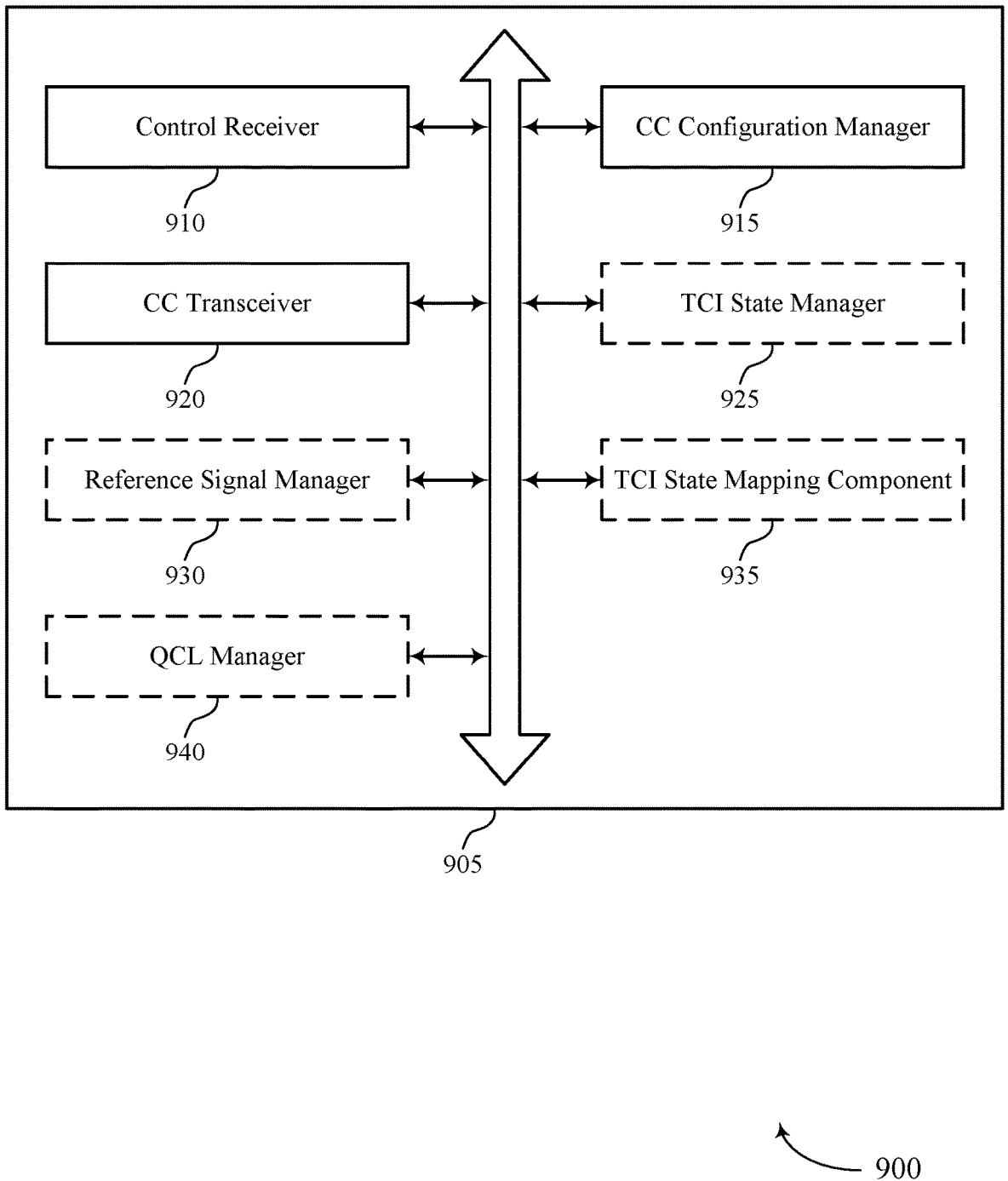
FIG. 9 shows a block diagram of a communications manager that supports transmission configuration indicator state activation techniques for carrier aggregation in accordance with aspects of the present disclosure.

FIG. 9 shows a block diagram 900 of a communications manager 905 that supports transmission configuration indicator state activation techniques for carrier aggregation in accordance with aspects of the present disclosure. The communications manager 905 may be an example of aspects of a communications manager 715, a communications manager 815, or a communications manager 1010 described herein. The communications manager 905 may include a control receiver 910, a CC configuration manager 915, a CC transceiver 920, a TCI state manager 925, a reference signal manager 930, a TCI state mapping component 935, and a QCL manager 940. Each of these modules may communicate, directly or indirectly, with one another (e.g., via one or more buses).

The control receiver 910 may receive a medium access control-control element from a network entity that indicates, for a set of component carriers configured for the UE, two or more sets of active transmission configuration indicator states.

The CC configuration manager 915 may determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states.

The CC transceiver 920 may communicate with the network entity using at least the first component carrier and the second component carrier based on the determining.

The TCI state manager 925 may receive, in the medium access control-control element, an activation command for the first component carrier, where the activation command includes a first bit that is set to indicate that different sets of active transmission configuration indicator states are activated for different component carriers of the set of component carriers.

In some examples, the TCI state manager 925 may identify, based on the activation command for the first component carrier, a first active transmission configuration indicator state. In some examples, the TCI state manager 925 may activate one or more transmission configuration indicator states of at least the second component carrier that are associated with the first reference signal. In some examples, the TCI state manager 925 may activate transmission configuration indicator states that are associated with the first reference signal of each remaining component carrier of the set of component carriers. In some examples, the TCI state manager 925 may repeat the identifying and activating for one or more other active transmission configuration indicator states provided in the medium access control-control element that include the first bit that is set to indicate that different sets of active transmission configuration indicator states are activated.

In some examples, the TCI state manager 925 may receive configuration information that indicates a subset of available transmission configuration indicator states, where the subset is less than a total number of configurable transmission configuration indicator states. In some examples, the medium access control-control element explicitly indicates which transmission configuration indicator states are active for each component carrier. In some cases, the medium access control-control element includes a first set of bits associated with the first component carrier that indicate which transmission configuration indicator states of the subset of available transmission configuration indicator states are in the first set of active transmission configuration indicator states. In some cases, the medium access control-control element includes a second set of bits associated with the second component carrier that indicate which transmission configuration indicator states of the subset of available transmission configuration indicator states are in the second set of active transmission configuration indicator states.

In some cases, the medium access control-control element includes a first set of entries that are each associated with a corresponding component carrier of the set of component carriers, and where each entry of the first set of entries provides a component carrier identification, a bandwidth part identification. In some cases, the medium access control-control element includes at least a second entry outside of the first set of entries that indicates one or more active transmission configuration indicator states for two or more of the set of component carriers or bandwidth parts.

The reference signal manager 930 may identify a first reference signal associated with the first active transmission configuration indicator state.

The TCI state mapping component 935 may identify two or more mappings of active transmission configuration indicator states for the first component carrier and the second component carrier. In some examples, the TCI state mapping component 935 may receive, in the medium access control-control element, an activation command for a first mapping associated with the first set of active transmission configuration indicator states from the set of one or more active transmission configuration indicator states. In some examples, the TCI state mapping component 935 may activate the first set of active transmission configuration indicator states for the first component carrier based on the mapping.

In some cases, the activation command for the first set of active transmission configuration indicator states indicates one or more bandwidth part identifications, and an identification of the first set of active transmission configuration indicator states. In some cases, the mapping is received from the base station in radio resource control signaling.

The QCL manager 940 may identify QCL parameters associated with the TCI states. In some cases, the transmission configuration indicator states associated with the set of component carriers are in a same cell group in a millimeter wave frequency band with the same identification, and have the same spatial quasi-colocation parameters associated with them (i.e., the same TCI state in two CCs corresponds to a same beam). For example, a first TCI state is a first CC may have a first QCL-typeD reference signal, and the first TCI state in a second CC also has the first QCL-typeD reference signal, and so on for second, third, fourth TCI states of the first and second CC. In some cases, the activated transmission configuration indicator states in the component carriers and bandwidth parts in a sub-6 GHz frequency band use the Doppler or delay-related quasi-colocation reference signal associated with the bandwidth part associated with the activated transmission configuration indicator state (e.g., if a same TCI state is activated in different BWPs and has QCL-TypeA defined, the QCL-TypeA reference signal from a first BWP can be used to activate the same TCI state in a second BWP).

Figure 10:
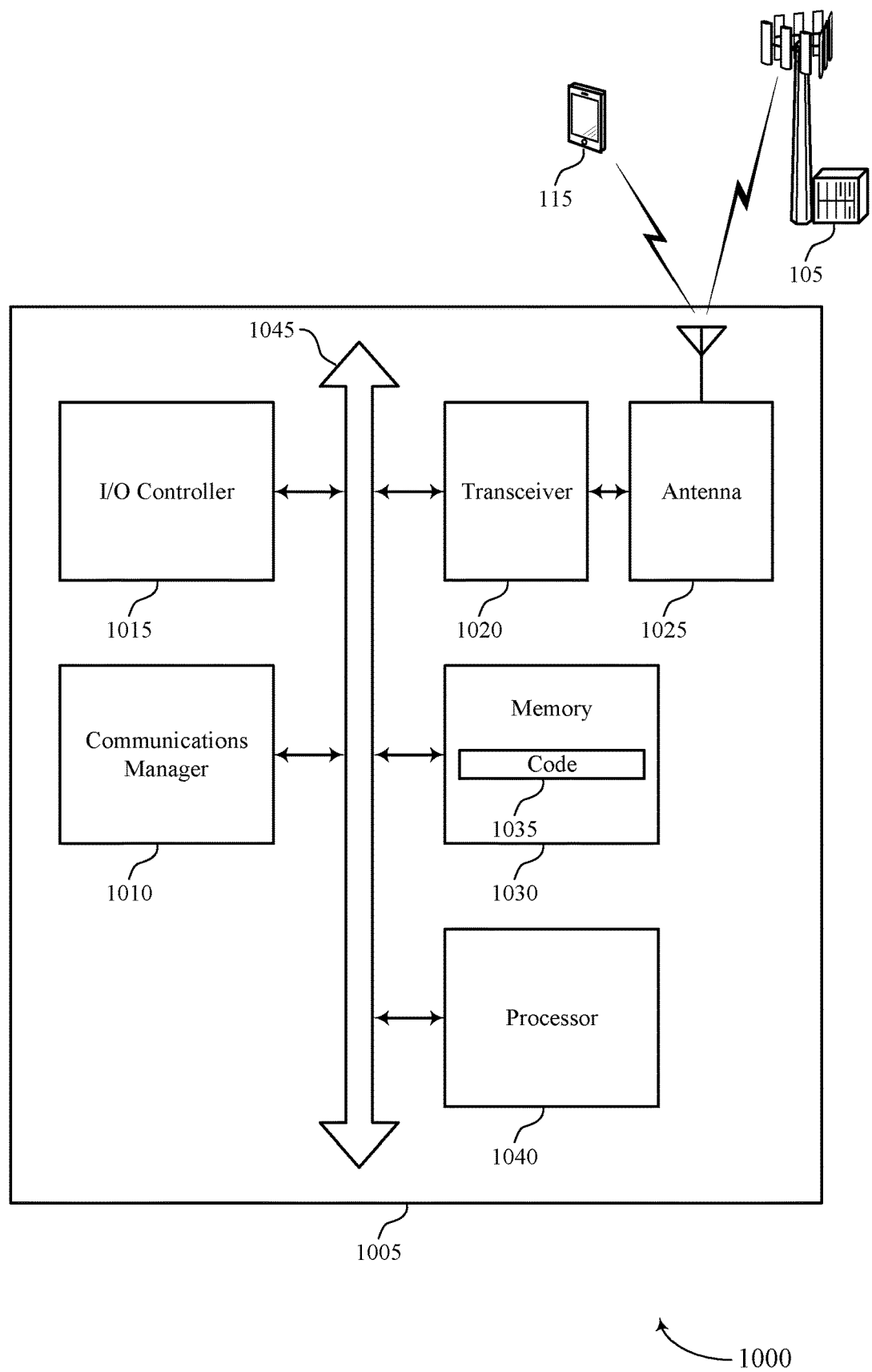
FIG. 10 shows a diagram of a system including a device that supports transmission configuration indicator state activation techniques for carrier aggregation in accordance with aspects of the present disclosure.

FIG. 10 shows a diagram of a system 1000 including a device 1005 that supports transmission configuration indicator state activation techniques for carrier aggregation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a medium access control-control element from a network entity that indicates, for a set of component carriers configured for the UE, two or more sets of active transmission configuration indicator states, determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states, and communicate with the network entity using at least the first component carrier and the second component carrier based on the determining.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission configuration indicator state activation techniques for carrier aggregation).

Based on using a single MAC-CE command to select multiple sets of active TCI states for PDSCH's that may be applied to multiple BWPs/CCs, a processor of a UE 115 may efficiently activate different sets of active TCI states for data communications. Such reduced signaling may provide for reduced overhead and enhanced system efficiency, reduced power consumption, and reduced latency.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
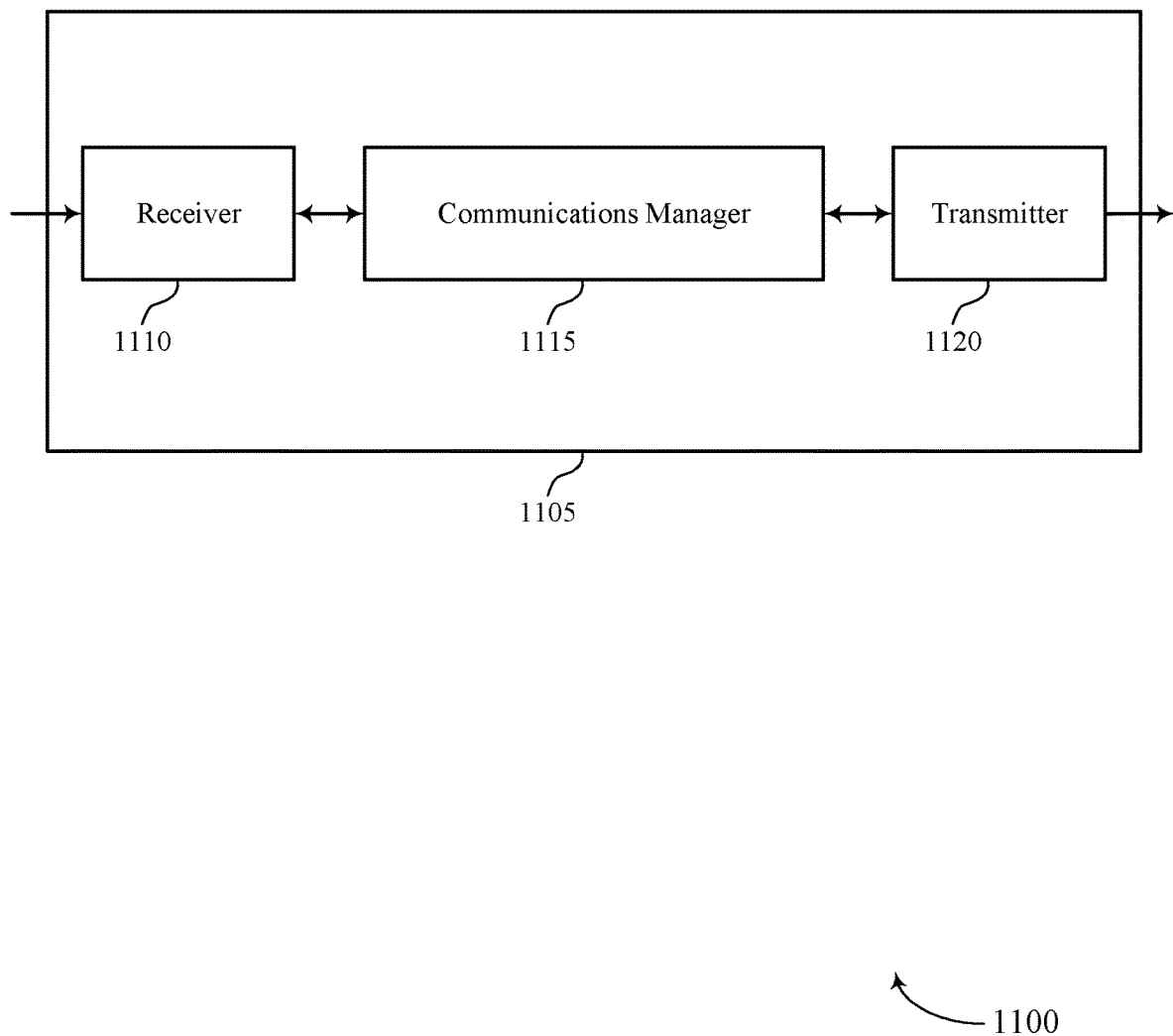
FIGS. 11 and 12 show block diagrams of devices that support transmission configuration indicator state activation techniques for carrier aggregation in accordance with aspects of the present disclosure.

FIG. 11 shows a block diagram 1100 of a device 1105 that supports transmission configuration indicator state activation techniques for carrier aggregation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission configuration indicator state activation techniques for carrier aggregation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, transmit a medium access control-control element to the UE that indicates, for the set of component carriers, the first set of active transmission configuration indicator states and the second set of active transmission configuration indicator states, and communicate with the network entity using at least the first component carrier and the second component carrier based on the determining. The communications manager 1115 may be an example of aspects of the communications manager 1410 described herein.

The communications manager 1115 may identify a medium access control-control element that indicates, for a plurality of component carriers configured for a UE, a set of one or more active transmission configuration indicator states, determine that a first component carrier and a second component carrier of the plurality of component carriers is associated with the set of one or more active transmission configuration indicator states based at least in part on the identified medium access control-control element, transmit the medium access control-control element to the UE, and communicate with the UE using at least the first component carrier and the second component carrier based at least in part on the determining.

The communications manager 1115 may be an example of means for performing various aspects of transmission configuration indicator state activation techniques for carrier aggregation as described herein. The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In another implementation, the communications manager 1115, or its sub-components, may be implemented in code (e.g., as communications management software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device.

In some examples, the communication manager 1115 may be configured to perform various operations (e.g., identifying, determining, transmitting) using or otherwise in cooperation with the receiver 1110, the transmitter 1120, or both.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1115 as described herein may be implemented to realize one or more potential advantages. One implementation may allow a base station 105 to save power and increase battery life by reducing signaling through using a single MAC-CE command to select multiple sets of active TCI states for PDSCH's that may be applied to multiple BWPs/CCs. Another implementation may provide improved quality and reliability of service at the base station 105, as latency and the number of separate resources may be reduced.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
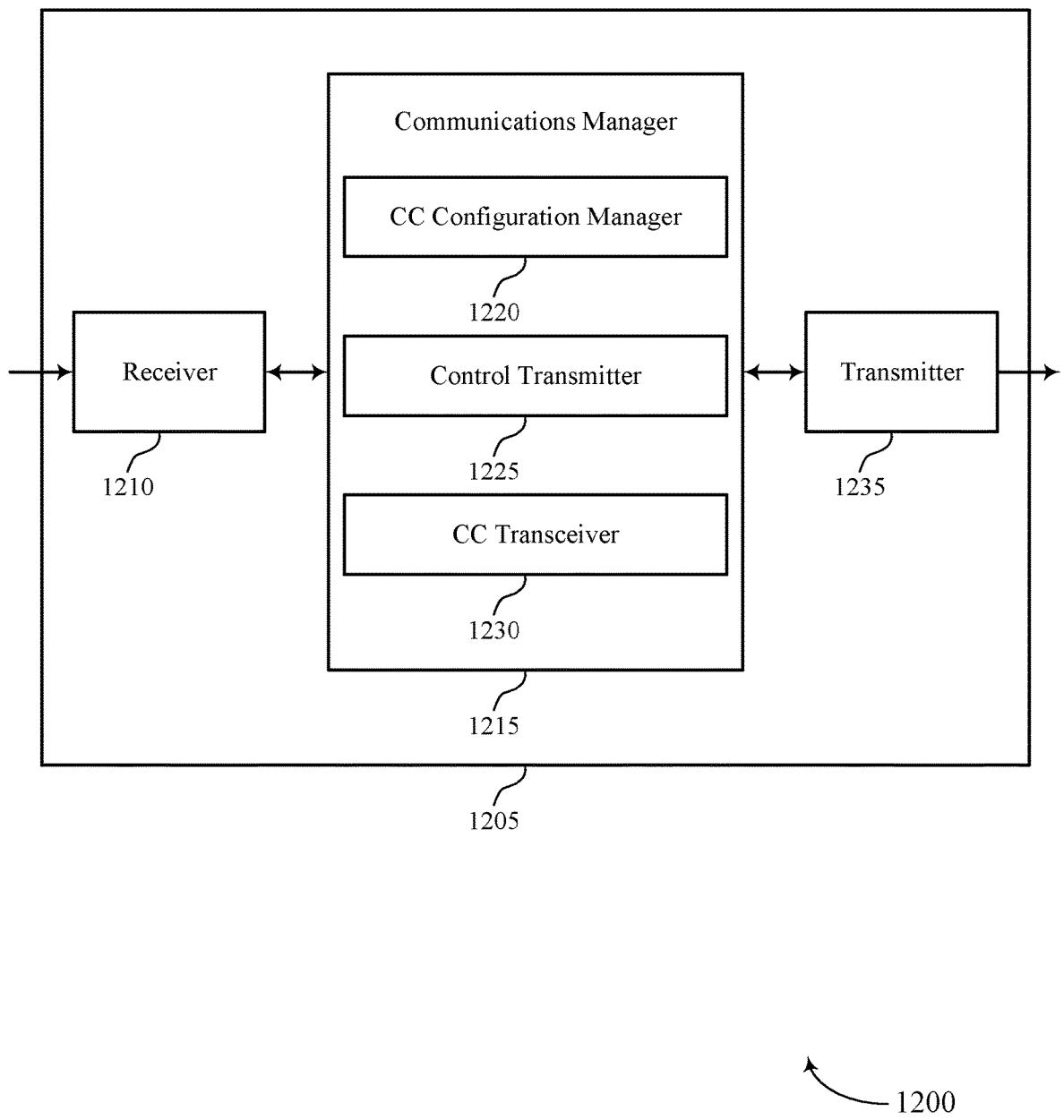

FIG. 12 shows a block diagram 1200 of a device 1205 that supports transmission configuration indicator state activation techniques for carrier aggregation in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission configuration indicator state activation techniques for carrier aggregation, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a CC configuration manager 1220, a control transmitter 1225, and a CC transceiver 1230. The communications manager 1215 may be an example of aspects of the communications manager 1410 described herein.

The CC configuration manager 1220 may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states.

The control transmitter 1225 may transmit a medium access control-control element to the UE that indicates, for the set of component carriers, the first set of active transmission configuration indicator states and the second set of active transmission configuration indicator states. In some examples, the control transmitter 1225 may transmit, in the medium access control-control element, a first plurality of entries that are each associated with a corresponding component carrier of the plurality of component carriers, each entry of the first plurality of entries providing a component carrier identification and a bandwidth part identification, and transmit, in the medium access control-control element, at least a second entry outside of the first plurality of entries that indicates one or more active transmission configuration indicator states for two or more of the plurality of component carriers or bandwidth parts.

The CC transceiver 1230 may communicate with the network entity using at least the first component carrier and the second component carrier based on the determining.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
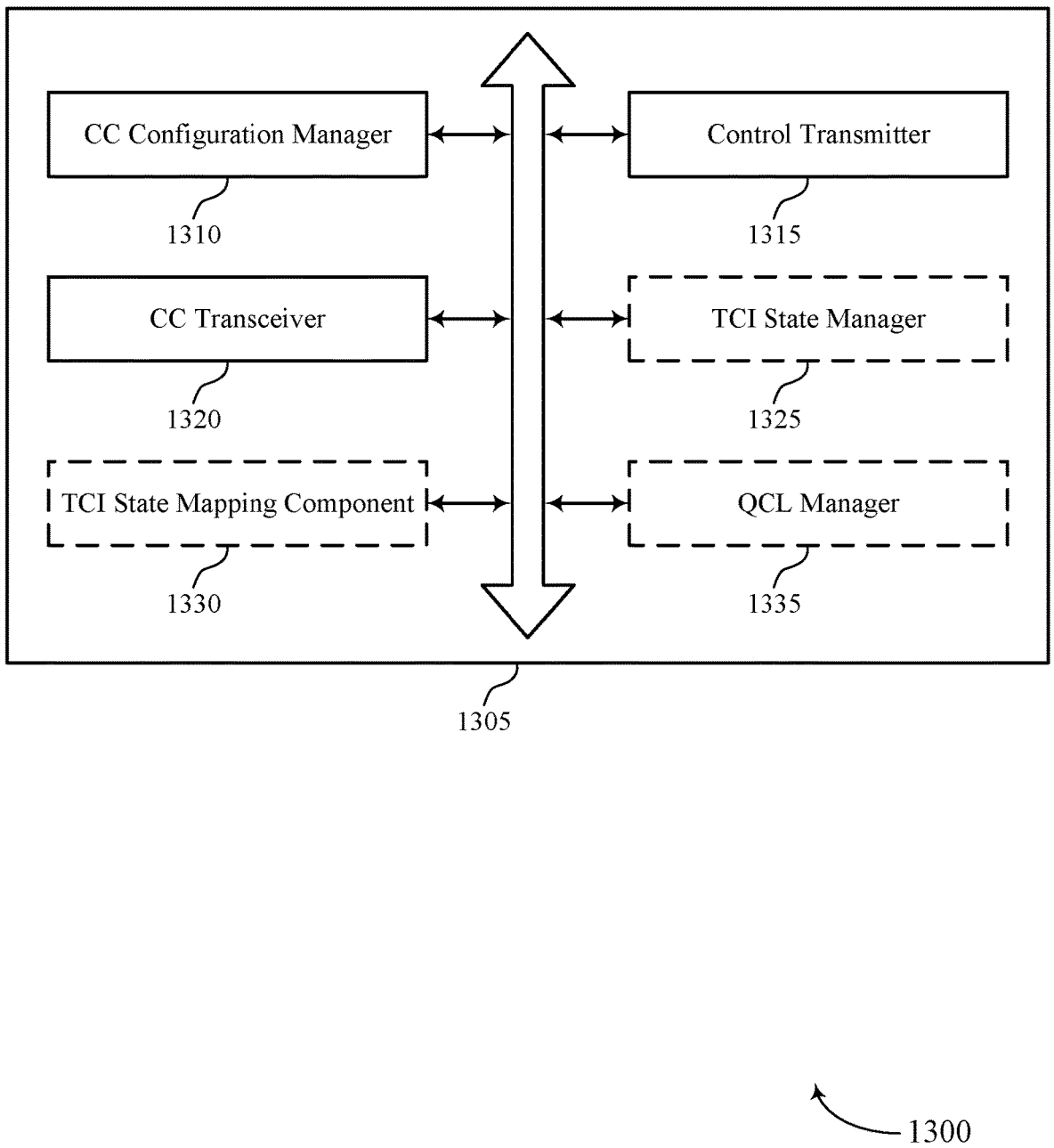
FIG. 13 shows a block diagram of a communications manager that supports transmission configuration indicator state activation techniques for carrier aggregation in accordance with aspects of the present disclosure.

FIG. 13 shows a block diagram 1300 of a communications manager 1305 that supports transmission configuration indicator state activation techniques for carrier aggregation in accordance with aspects of the present disclosure. The communications manager 1305 may be an example of aspects of a communications manager 1115, a communications manager 1215, or a communications manager 1410 described herein. The communications manager 1305 may include a CC configuration manager 1310, a control transmitter 1315, a CC transceiver 1320, a TCI state manager 1325, a TCI state mapping component 1330, and a QCL manager 1335. Each of these modules may communicate, directly or indirectly, with one another (e.g., via one or more buses).

The CC configuration manager 1310 may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states.

The control transmitter 1315 may transmit a medium access control-control element to the UE that indicates, for the set of component carriers, the first set of active transmission configuration indicator states and the second set of active transmission configuration indicator states.

The CC transceiver 1320 may communicate with the network entity using at least the first component carrier and the second component carrier based on the determining.

The TCI state manager 1325 may transmit, in the medium access control-control element, an activation command for the first component carrier, where the activation command includes a first bit that is set to indicate that different sets of active transmission configuration indicator states are activated for different component carriers of the set of component carriers. In some examples, the TCI state manager 1325 may transmit configuration information to the UE that indicates a subset of available transmission configuration indicator states, where the subset is less than a total number of configurable transmission configuration indicator states. In some examples, the medium access control-control element explicitly indicates which transmission configuration indicator states are active for each component carrier. In some cases, the activation command indicates a first active transmission configuration indicator state for the first component carrier having an associated first reference signal, and where one or more transmission configuration indicator states of at least the second component carrier that are associated with the first reference signal are activated.

In some cases, the medium access control-control element includes a first set of bits associated with the first component carrier that indicate which transmission configuration indicator states of the subset of available transmission configuration indicator states are in the first set of active transmission configuration indicator states. In some cases, the medium access control-control element includes a second set of bits associated with the second component carrier that indicate which transmission configuration indicator states of the subset of available transmission configuration indicator states are in the second set of active transmission configuration indicator states.

In some cases, the medium access control-control element includes a first set of entries that are each associated with a corresponding component carrier of the set of component carriers, and where each entry of the first set of entries provides a component carrier identification, a bandwidth part identification. In some cases, the medium access control-control element includes at least a second entry outside of the first set of entries that indicates one or more active transmission configuration indicator states for two or more of the set of component carriers or bandwidth parts.

The TCI state mapping component 1330 may identify two or more mappings of active transmission configuration indicator states for the first component carrier and the second component carrier. In some examples, the TCI state mapping component 1330 may transmit, in the medium access control-control element, an activation command for a first mapping associated with the first set of active transmission configuration indicator states from the set of one or more active transmission configuration indicator states, and where the second set of active transmission configuration indicator states for the second component carrier are activated based on a second mapping provided in the medium access control-control element. In some cases, the activation command for the first set of active transmission configuration indicator states indicates one or more bandwidth part identifications, and an identification of the first mapping. In some cases, the mappings are transmitted in radio resource control signaling.

The QCL manager 1335 may identify QCL parameters associated with TCI states. In some cases, the transmission configuration indicator states associated with the set of component carriers are in a same cell group in a millimeter wave frequency band with the same identification have the same spatial quasi-colocation parameters (i.e., the same TCI state in two CCs corresponds to a same beam). In some cases, the activated transmission configuration indicator states in the component carriers and bandwidth parts in a sub-6 GHz frequency band use the Doppler or delay-related quasi-colocation reference signal associated with the bandwidth part associated with the activated transmission configuration indicator state (e.g., if a same TCI state is activated in different BWPs and has QCL-TypeA defined, the QCL-TypeA reference signal from a first BWP can be used to activate the same TCI state in a second BWP).

Figure 14:
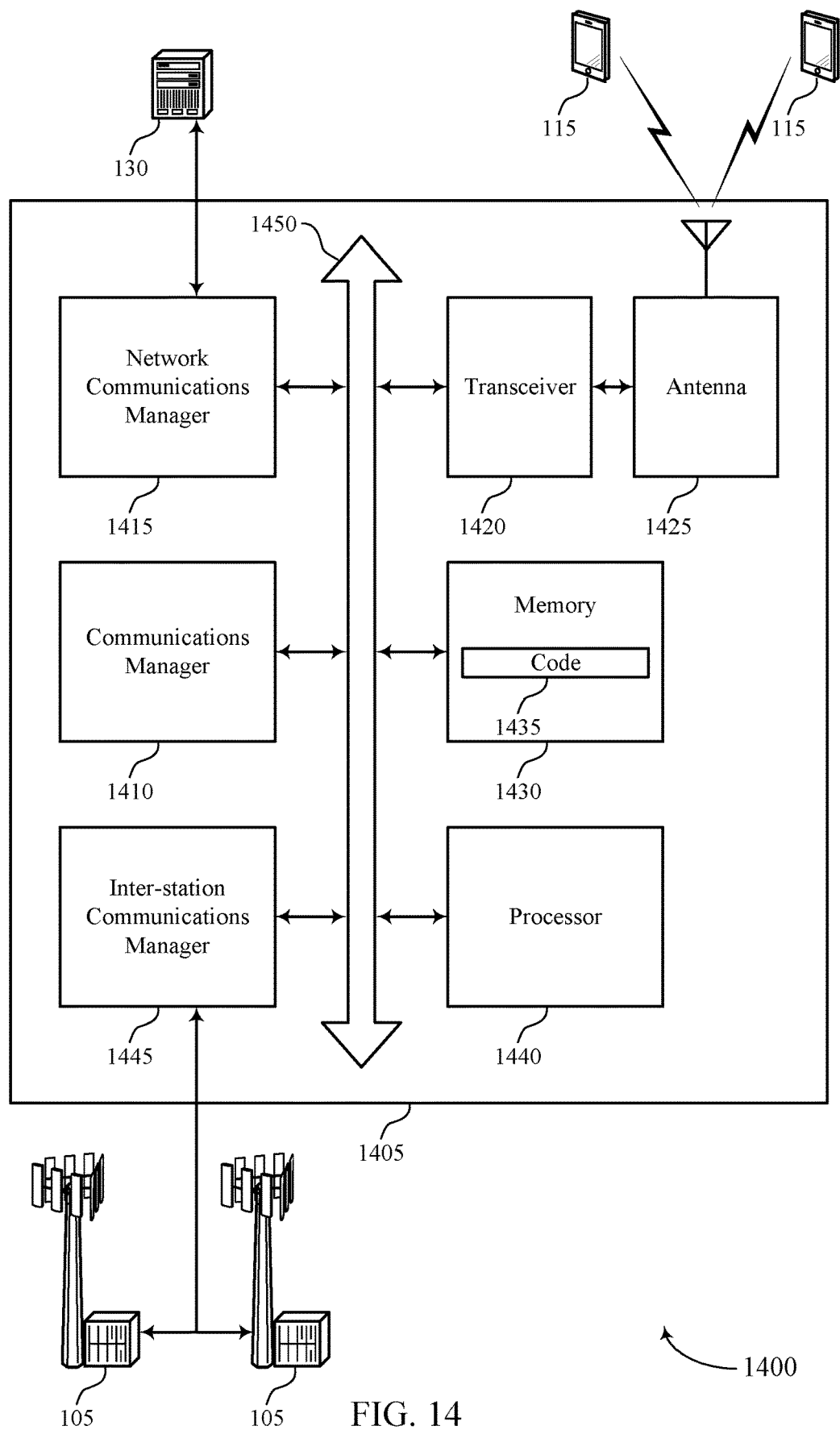
FIG. 14 shows a diagram of a system including a device that supports transmission configuration indicator state activation techniques for carrier aggregation in accordance with aspects of the present disclosure.

FIG. 14 shows a diagram of a system 1400 including a device 1405 that supports transmission configuration indicator state activation techniques for carrier aggregation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states, transmit a medium access control-control element to the UE that indicates, for the set of component carriers, the first set of active transmission configuration indicator states and the second set of active transmission configuration indicator states, and communicate with the network entity using at least the first component carrier and the second component carrier based on the determining.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmission configuration indicator state activation techniques for carrier aggregation).

Based on using a single MAC-CE command to select multiple sets of active TCI states for PDSCH's that may be applied to multiple BWPs/CCs, a processor of a base station 105 may efficiently activate different sets of active TCI states for data communications. Such reduced signaling may provide for reduced overhead and enhanced system efficiency, reduced power consumption, and reduced latency.

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
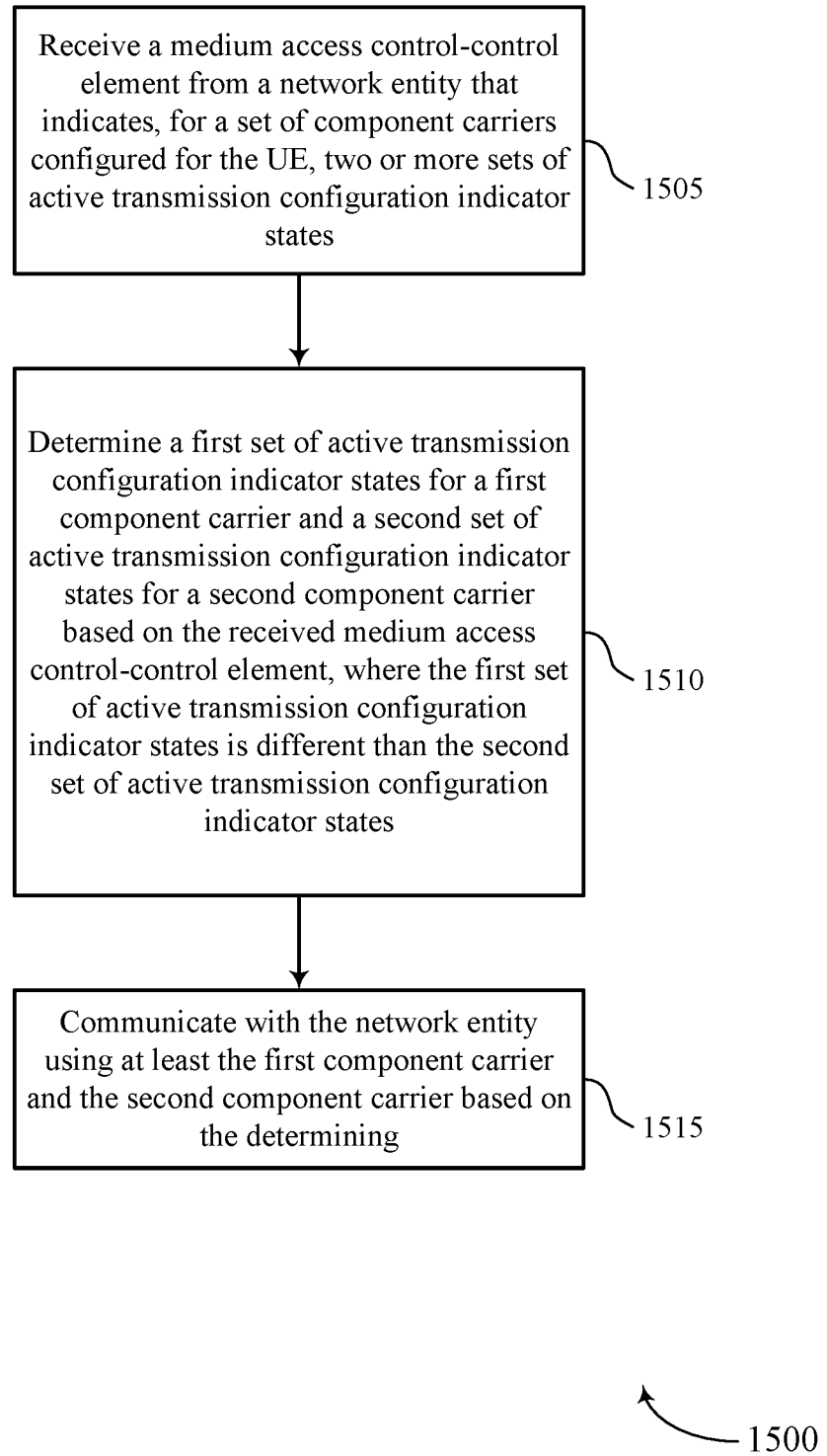
FIGS. 15 through 22 show flowcharts illustrating methods that support transmission configuration indicator state activation techniques for carrier aggregation in accordance with aspects of the present disclosure.

FIG. 15 shows a flowchart illustrating a method 1500 that supports transmission configuration indicator state activation techniques for carrier aggregation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a medium access control-control element from a network entity that indicates, for a set of component carriers configured for the UE, two or more sets of active transmission configuration indicator states. The operations of 1505 may be performed according to the methods described herein. In some examples, aspects of the operations of 1505 may be performed by a control receiver as described with reference to FIGS. 7 through 10.

At 1510, the UE may determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states. The operations of 1510 may be performed according to the methods described herein. In some examples, aspects of the operations of 1510 may be performed by a CC configuration manager as described with reference to FIGS. 7 through 10.

At 1515, the UE may communicate with the network entity using at least the first component carrier and the second component carrier based on the determining. The operations of 1515 may be performed according to the methods described herein. In some examples, aspects of the operations of 1515 may be performed by a CC transceiver as described with reference to FIGS. 7 through 10.

Figure 16:
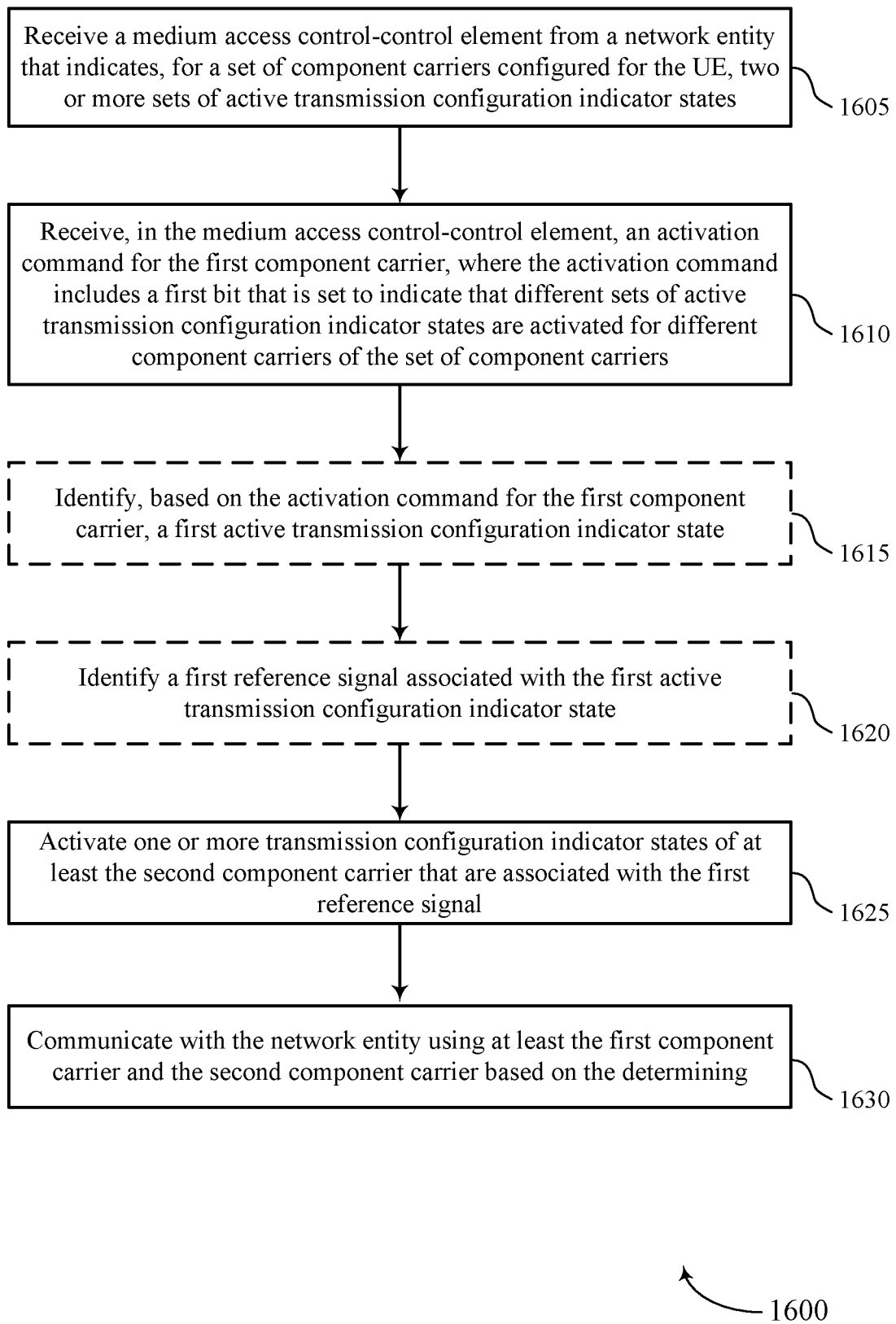

FIG. 16 shows a flowchart illustrating a method 1600 that supports transmission configuration indicator state activation techniques for carrier aggregation in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a medium access control-control element from a network entity that indicates, for a set of component carriers configured for the UE, two or more sets of active transmission configuration indicator states. The operations of 1605 may be performed according to the methods described herein. In some examples, aspects of the operations of 1605 may be performed by a control receiver as described with reference to FIGS. 7 through 10.

At 1610, the UE may receive, in the medium access control-control element, an activation command for the first component carrier, where the activation command includes a first bit that is set to indicate that different sets of active transmission configuration indicator states are activated for different component carriers of the set of component carriers. The operations of 1610 may be performed according to the methods described herein. In some examples, aspects of the operations of 1610 may be performed by a TCI state manager as described with reference to FIGS. 7 through 10.

At 1615, the UE may identify, based on the activation command for the first component carrier, a first active transmission configuration indicator state. The operations of 1615 may be performed according to the methods described herein. In some examples, aspects of the operations of 1615 may be performed by a TCI state manager as described with reference to FIGS. 7 through 10.

At 1620, the UE may identify a first reference signal associated with the first active transmission configuration indicator state. The operations of 1620 may be performed according to the methods described herein. In some examples, aspects of the operations of 1620 may be performed by a reference signal manager as described with reference to FIGS. 7 through 10.

At 1625, the UE may activate one or more transmission configuration indicator states of at least the second component carrier that are associated with the first reference signal. The operations of 1625 may be performed according to the methods described herein. In some examples, aspects of the operations of 1625 may be performed by a TCI state manager as described with reference to FIGS. 7 through 10.

At 1630, the UE may communicate with the network entity using at least the first component carrier and the second component carrier based on the determining. The operations of 1630 may be performed according to the methods described herein. In some examples, aspects of the operations of 1630 may be performed by a CC transceiver as described with reference to FIGS. 7 through 10.

Figure 17:
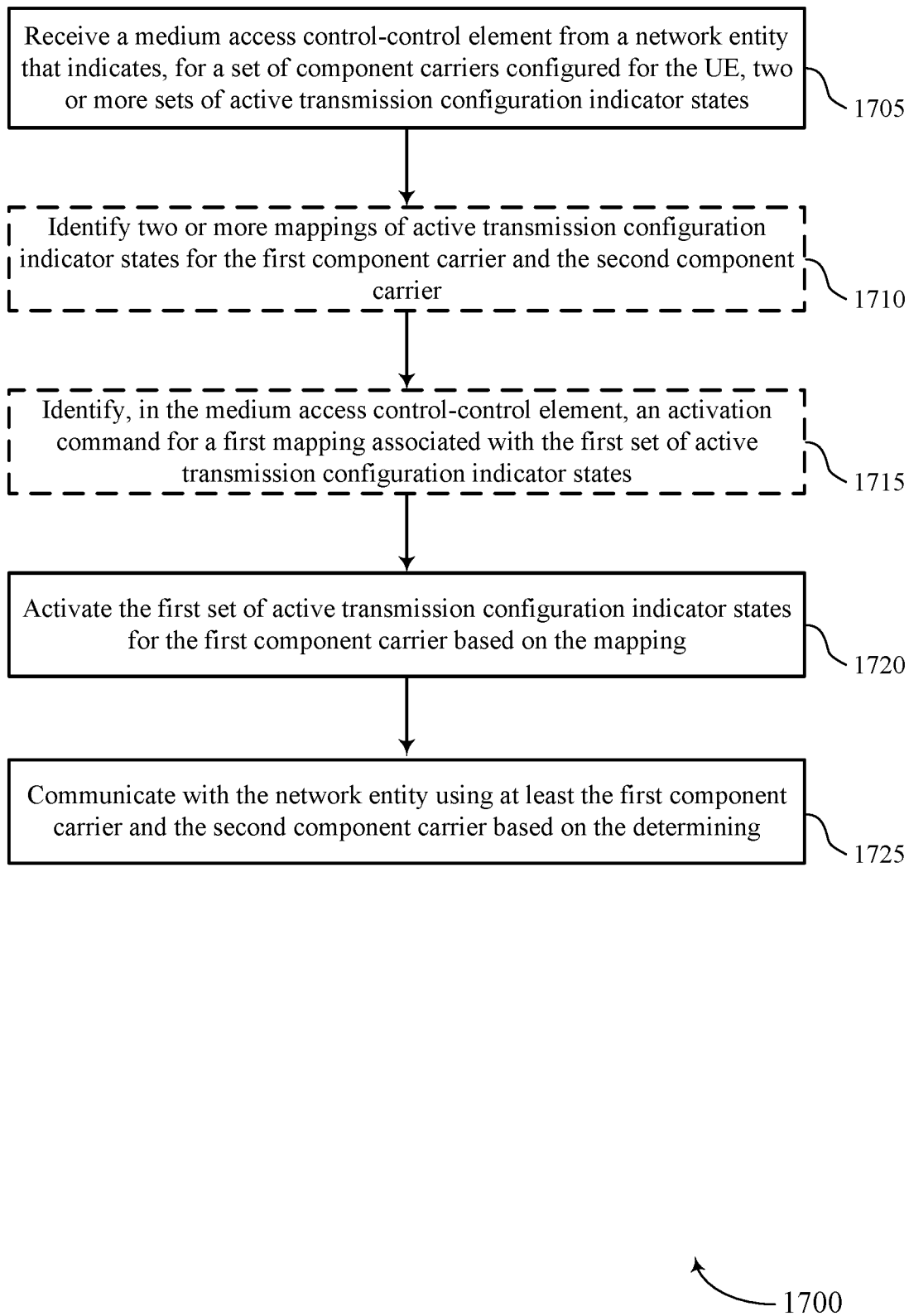

FIG. 17 shows a flowchart illustrating a method 1700 that supports transmission configuration indicator state activation techniques for carrier aggregation in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a medium access control-control element from a network entity that indicates, for a set of component carriers configured for the UE, two or more sets of active transmission configuration indicator states. The operations of 1705 may be performed according to the methods described herein. In some examples, aspects of the operations of 1705 may be performed by a control receiver as described with reference to FIGS. 7 through 10.

At 1710, the UE may identify two or more mappings of active transmission configuration indicator states for the first component carrier and the second component carrier. The operations of 1710 may be performed according to the methods described herein. In some examples, aspects of the operations of 1710 may be performed by a TCI state mapping component as described with reference to FIGS. 7 through 10.

At 1715, the UE may identify, in the medium access control-control element, an activation command for a first mapping associated with the first set of active transmission configuration indicator states. The operations of 1715 may be performed according to the methods described herein. In some examples, aspects of the operations of 1715 may be performed by a TCI state mapping component as described with reference to FIGS. 7 through 10.

At 1720, the UE may activate the first set of active transmission configuration indicator states for the first component carrier based on the mapping. The operations of 1720 may be performed according to the methods described herein. In some examples, aspects of the operations of 1720 may be performed by a TCI state mapping component as described with reference to FIGS. 7 through 10.

At 1725, the UE may communicate with the network entity using at least the first component carrier and the second component carrier based on the determining. The operations of 1725 may be performed according to the methods described herein. In some examples, aspects of the operations of 1725 may be performed by a CC transceiver as described with reference to FIGS. 7 through 10.

Figure 18:
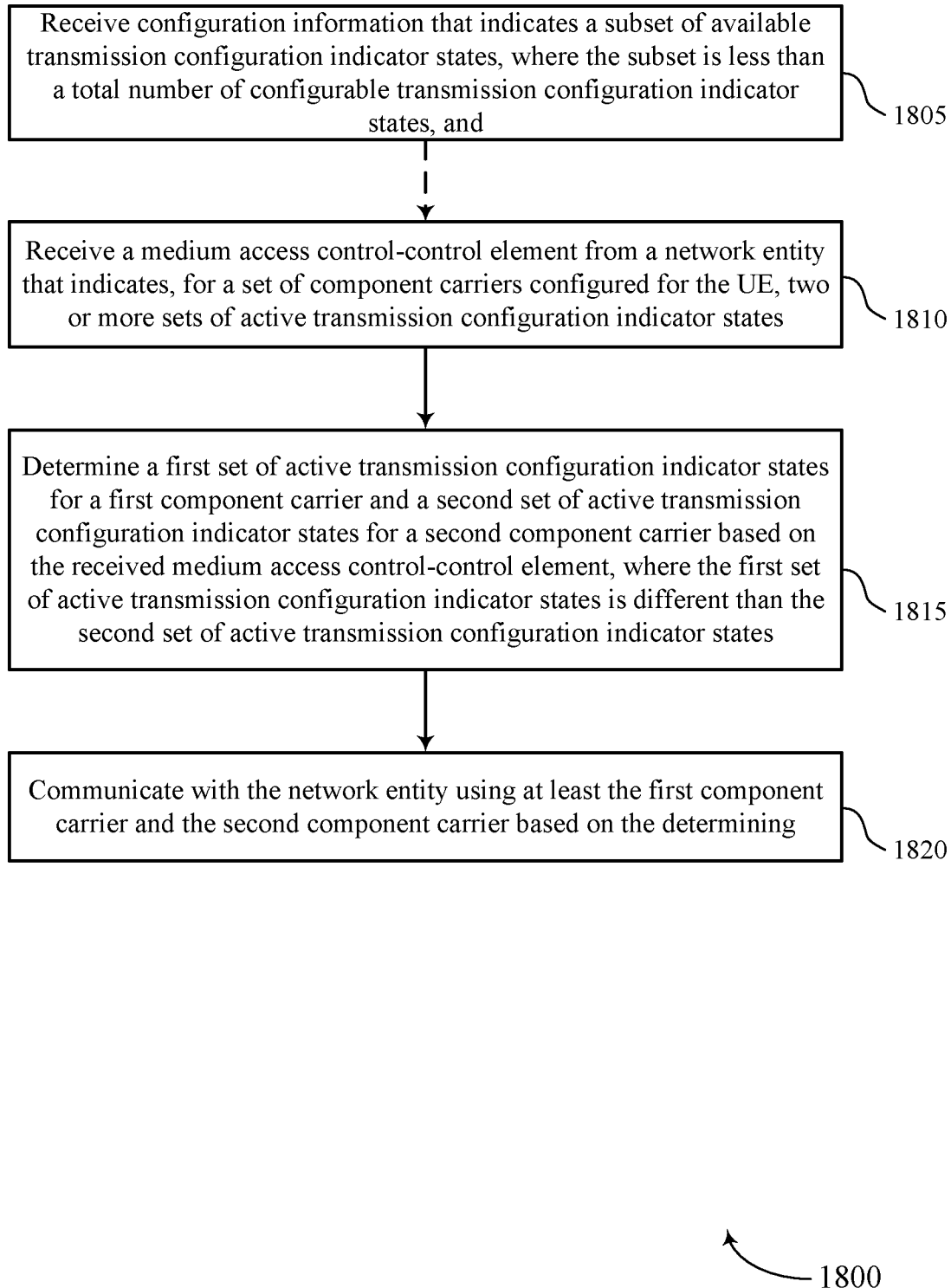

FIG. 18 shows a flowchart illustrating a method 1800 that supports transmission configuration indicator state activation techniques for carrier aggregation in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive configuration information that indicates a subset of available transmission configuration indicator states, where the subset is less than a total number of configurable transmission configuration indicator states. The operations of 1805 may be performed according to the methods described herein. In some examples, aspects of the operations of 1805 may be performed by a TCI state manager as described with reference to FIGS. 7 through 10.

At 1810, the UE may receive a medium access control-control element from a network entity that indicates, for a set of component carriers configured for the UE, two or more sets of active transmission configuration indicator states. The operations of 1810 may be performed according to the methods described herein. In some examples, aspects of the operations of 1810 may be performed by a control receiver as described with reference to FIGS. 7 through 10. In some cases, the medium access control-control element explicitly indicates which transmission configuration indicator states are active for each component carrier.

At 1815, the UE may determine a first set of active transmission configuration indicator states for a first component carrier and a second set of active transmission configuration indicator states for a second component carrier based on the received medium access control-control element, where the first set of active transmission configuration indicator states is different than the second set of active transmission configuration indicator states. The operations of 1815 may be performed according to the methods described herein. In some examples, aspects of the operations of 1815 may be performed by a CC configuration manager as described with reference to FIGS. 7 through 10.

At 1820, the UE may communicate with the network entity using at least the first component carrier and the second component carrier based on the determining. The operations of 1820 may be performed according to the methods described herein. In some examples, aspects of the operations of 1820 may be performed by a CC transceiver as described with reference to FIGS. 7 through 10.

Figure 19:
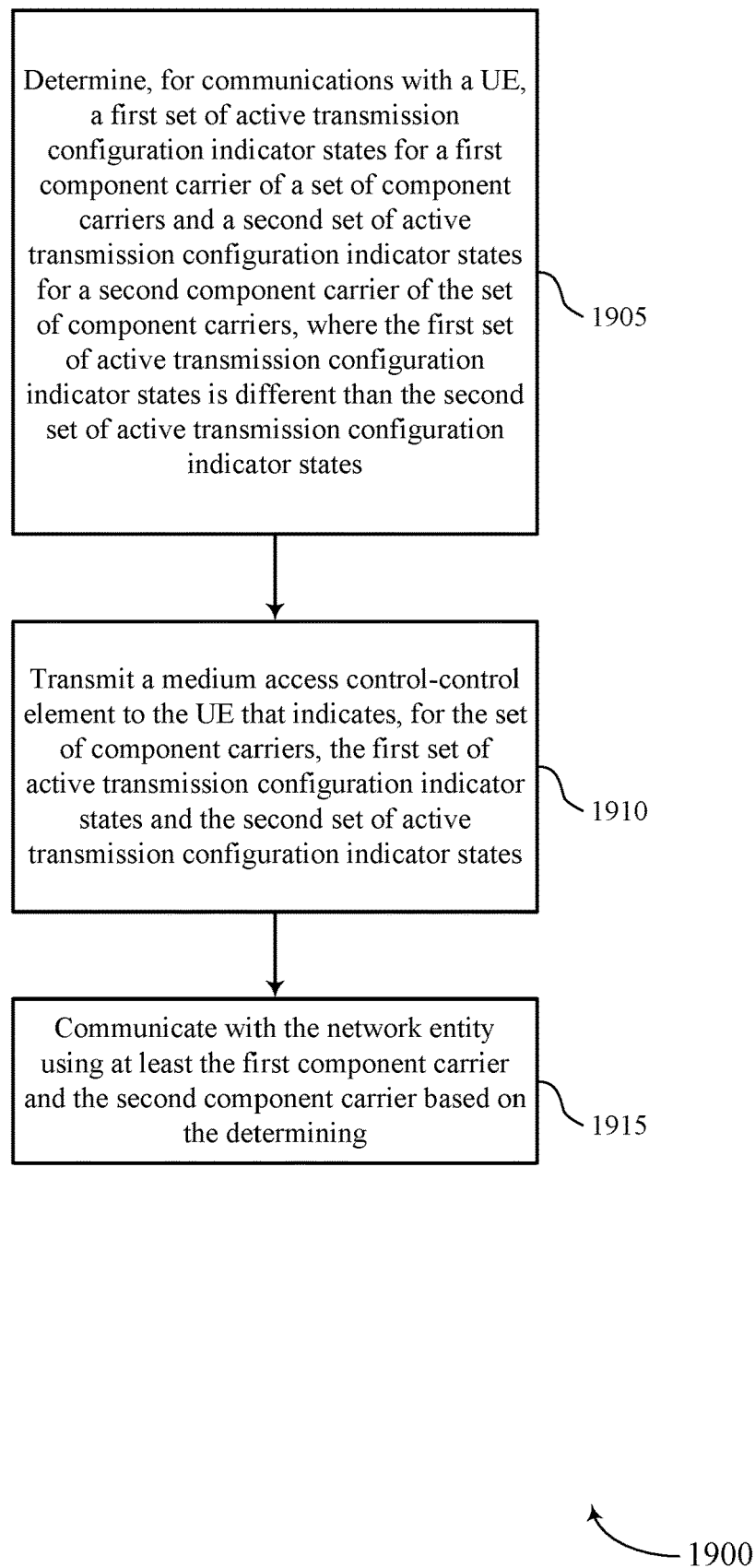

FIG. 19 shows a flowchart illustrating a method 1900 that supports transmission configuration indicator state activation techniques for carrier aggregation in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states. The operations of 1905 may be performed according to the methods described herein. In some examples, aspects of the operations of 1905 may be performed by a CC configuration manager as described with reference to FIGS. 11 through 14.

At 1910, the base station may transmit a medium access control-control element to the UE that indicates, for the set of component carriers, the first set of active transmission configuration indicator states and the second set of active transmission configuration indicator states. The operations of 1910 may be performed according to the methods described herein. In some examples, aspects of the operations of 1910 may be performed by a control transmitter as described with reference to FIGS. 11 through 14.

At 1915, the base station may communicate with the network entity using at least the first component carrier and the second component carrier based on the determining. The operations of 1915 may be performed according to the methods described herein. In some examples, aspects of the operations of 1915 may be performed by a CC transceiver as described with reference to FIGS. 11 through 14.

Figure 20:
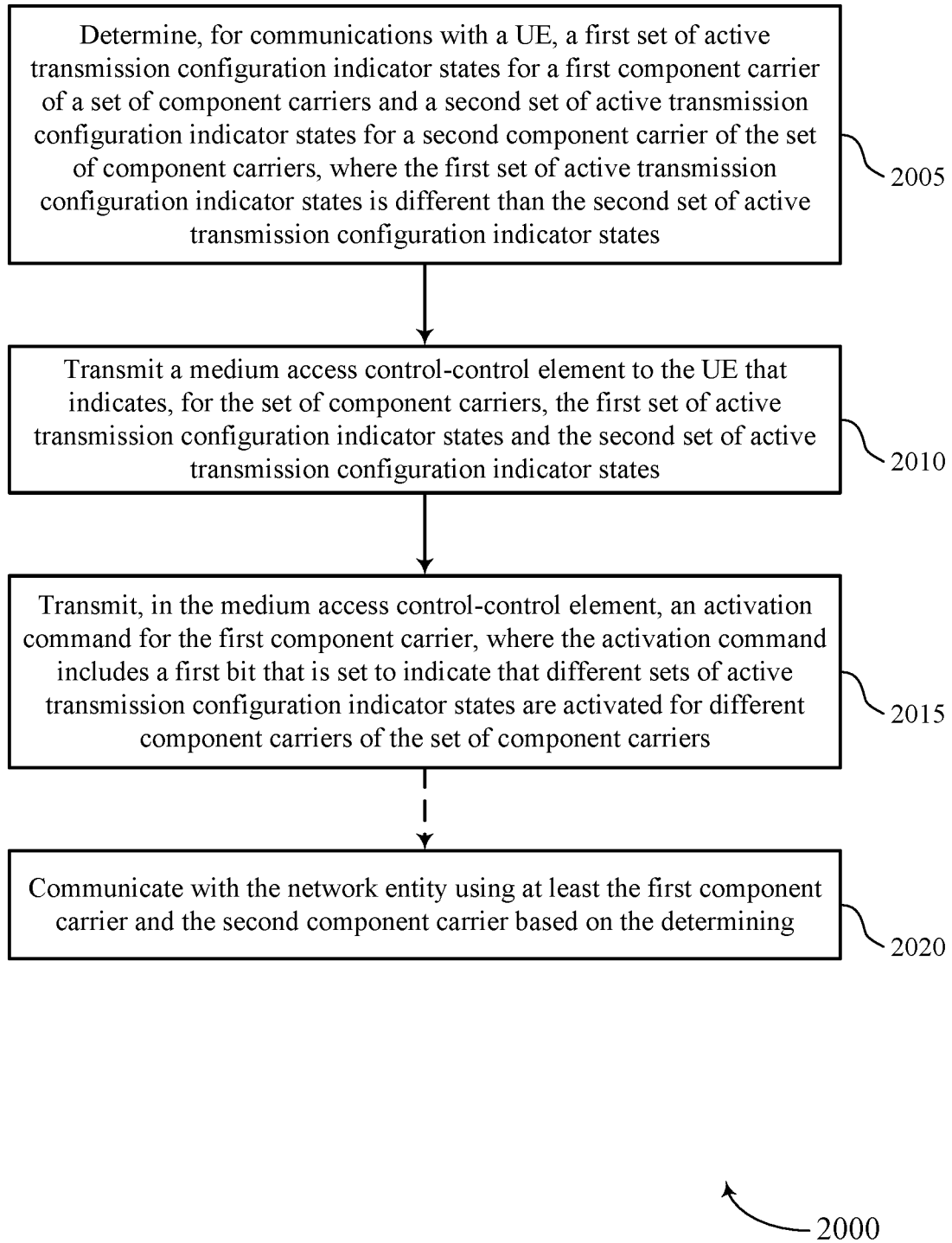

FIG. 20 shows a flowchart illustrating a method 2000 that supports transmission configuration indicator state activation techniques for carrier aggregation in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states. The operations of 2005 may be performed according to the methods described herein. In some examples, aspects of the operations of 2005 may be performed by a CC configuration manager as described with reference to FIGS. 11 through 14.

At 2010, the base station may transmit a medium access control-control element to the UE that indicates, for the set of component carriers, the first set of active transmission configuration indicator states and the second set of active transmission configuration indicator states. The operations of 2010 may be performed according to the methods described herein. In some examples, aspects of the operations of 2010 may be performed by a control transmitter as described with reference to FIGS. 11 through 14.

At 2015, the base station may transmit, in the medium access control-control element, an activation command for the first component carrier, where the activation command includes a first bit that is set to indicate that different sets of active transmission configuration indicator states are activated for different component carriers of the set of component carriers. The operations of 2015 may be performed according to the methods described herein. In some examples, aspects of the operations of 2015 may be performed by a TCI state manager as described with reference to FIGS. 11 through 14.

At 2020, the base station may communicate with the network entity using at least the first component carrier and the second component carrier based on the determining. The operations of 2020 may be performed according to the methods described herein. In some examples, aspects of the operations of 2020 may be performed by a CC transceiver as described with reference to FIGS. 11 through 14.

Figure 21:
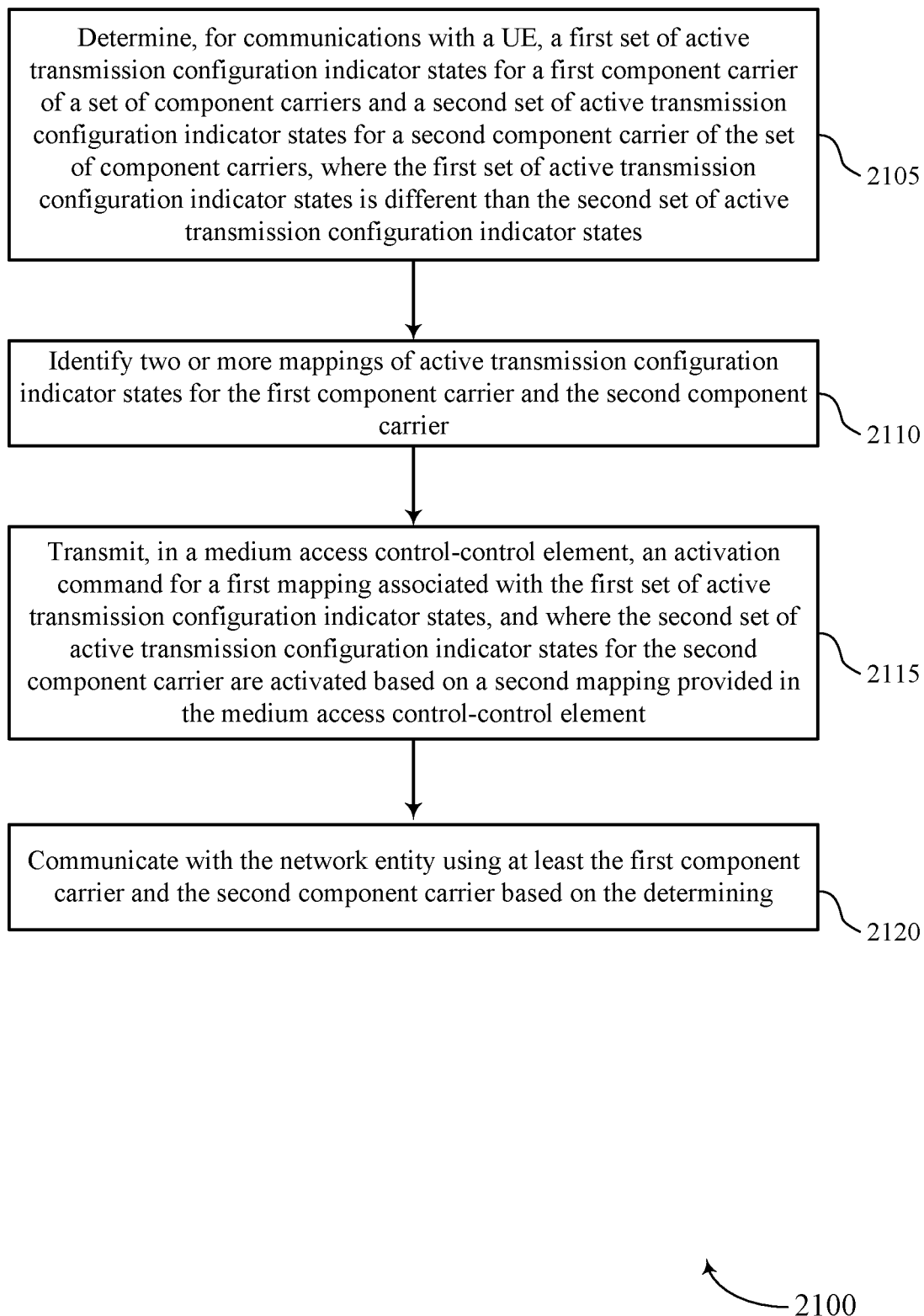

FIG. 21 shows a flowchart illustrating a method 2100 that supports transmission configuration indicator state activation techniques for carrier aggregation in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states. The operations of 2105 may be performed according to the methods described herein. In some examples, aspects of the operations of 2105 may be performed by a CC configuration manager as described with reference to FIGS. 11 through 14.

At 2110, the base station may identify two or more mappings of active transmission configuration indicator states for the first component carrier and the second component carrier. The operations of 2110 may be performed according to the methods described herein. In some examples, aspects of the operations of 2110 may be performed by a TCI state mapping component as described with reference to FIGS. 11 through 14.

At 2115, the base station may transmit, in a medium access control-control element, an activation command for a first mapping associated with the first set of active transmission configuration indicator states, and where the second set of active transmission configuration indicator states for the second component carrier are activated based on a second mapping provided in the medium access control-control element. The operations of 2115 may be performed according to the methods described herein. In some examples, aspects of the operations of 2115 may be performed by a TCI state mapping component as described with reference to FIGS. 11 through 14.

At 2120, the base station may communicate with the network entity using at least the first component carrier and the second component carrier based on the determining. The operations of 2120 may be performed according to the methods described herein. In some examples, aspects of the operations of 2120 may be performed by a CC transceiver as described with reference to FIGS. 11 through 14.

Figure 22:
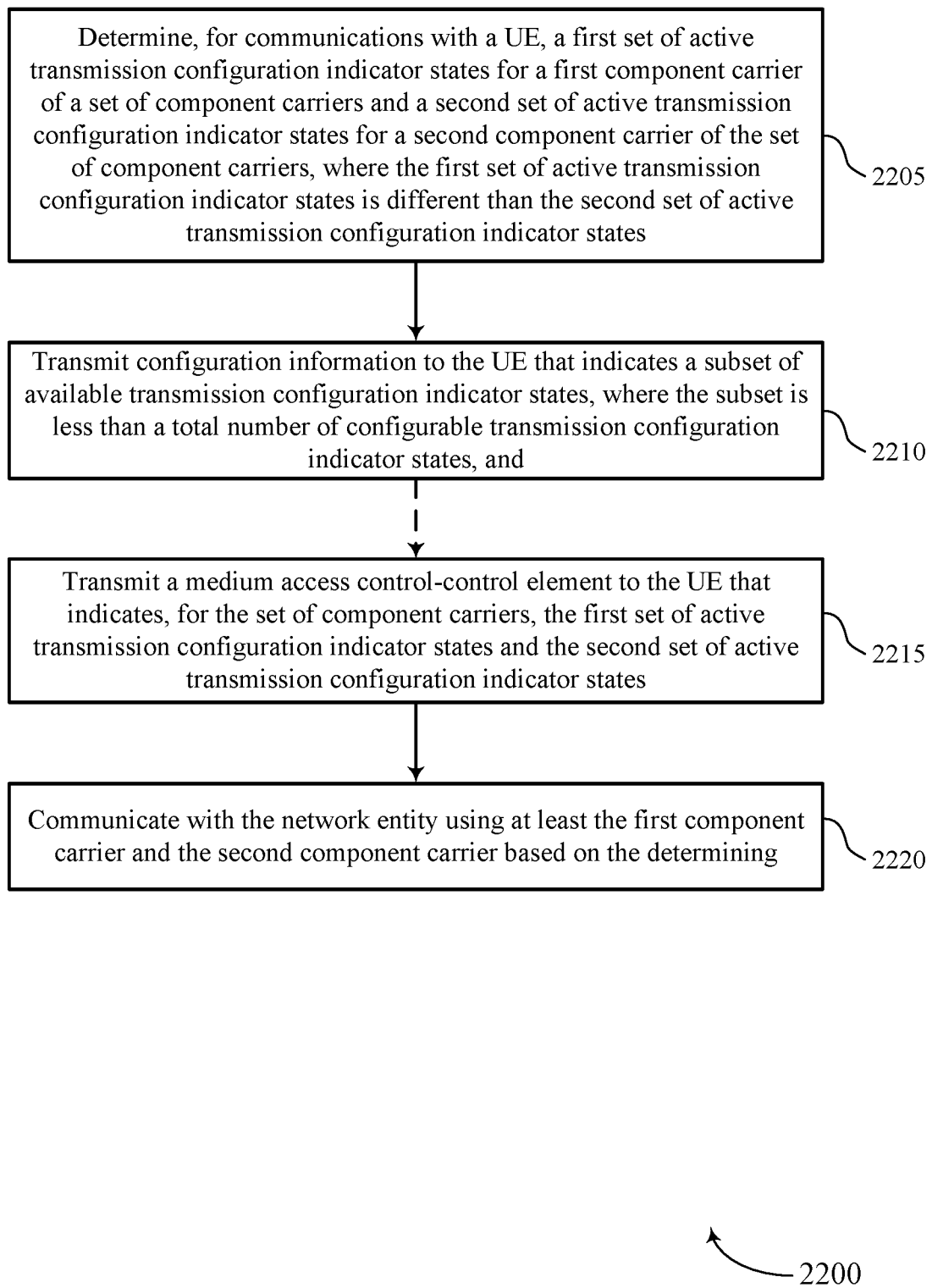

FIG. 22 shows a flowchart illustrating a method 2200 that supports transmission configuration indicator state activation techniques for carrier aggregation in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may determine, for communications with a UE, a first set of active transmission configuration indicator states for a first component carrier of a set of component carriers and a second set of active transmission configuration indicator states for a second component carrier of the set of component carriers, where the first set of active transmission configuration indicator states is different than the second set of active transmission configuration indicator states. The operations of 2205 may be performed according to the methods described herein. In some examples, aspects of the operations of 2205 may be performed by a CC configuration manager as described with reference to FIGS. 11 through 14.

At 2210, the base station may transmit configuration information to the UE that indicates a subset of available transmission configuration indicator states, where the subset is less than a total number of configurable transmission configuration indicator states. The operations of 2210 may be performed according to the methods described herein. In some examples, aspects of the operations of 2210 may be performed by a TCI state manager as described with reference to FIGS. 11 through 14.

At 2215, the base station may transmit a medium access control-control element to the UE that indicates, for the set of component carriers, the first set of active transmission configuration indicator states and the second set of active transmission configuration indicator states. The operations of 2215 may be performed according to the methods described herein. In some examples, aspects of the operations of 2215 may be performed by a control transmitter as described with reference to FIGS. 11 through 14. In some cases, the medium access control-control element explicitly indicates which transmission configuration indicator states are active for each component carrier.

At 2220, the base station may communicate with the network entity using at least the first component carrier and the second component carrier based on the determining. The operations of 2220 may be performed according to the methods described herein. In some examples, aspects of the operations of 2220 may be performed by a CC transceiver as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE, comprising: receiving a medium access control-control element that indicates, for a plurality of component carriers configured for the UE, a set of one or more active transmission configuration indicator states; determining that the set of one or more active transmission configuration indicator states is associated with a first component carrier and a second component carrier of the plurality of component carriers based at least in part on the received medium access control-control element; and communicating with a network entity using at least the first component carrier and the second component carrier based at least in part on the determining.

Example 2: The method of example 1, receiving the medium access control-control element comprising: receiving, in the medium access control-control element, a first plurality of entries that are each associated with a corresponding component carrier of the plurality of component carriers, each entry of the first plurality of entries providing a component carrier identification and a bandwidth part identification; and receiving, in the medium access control-control element, at least a second entry outside of the first plurality of entries that indicates one or more active transmission configuration indicator states for two or more of the plurality of component carriers or bandwidth parts.

Example 3: The method of example 1, further comprising: identifying two or more mappings of active transmission configuration indicator states for the first component carrier and the second component carrier; receiving, in the medium access control-control element, an activation command for a first mapping associated with a first set of active transmission configuration indicator states from the set of one or more active transmission configuration indicator states; and activating the first set of active transmission configuration indicator states for the first component carrier based at least in part on the first mapping.

Example 4: The method of example 3, the activation command for the first set of active transmission configuration indicator states indicating one or more bandwidth part identifications, and an identification of the first set of active transmission configuration indicator states.

Example 5: The method of example 3, the first mapping being received from the network entity in radio resource control signaling.

Example 6: The method of example 1, each of the plurality of component carriers having an associated set of transmission configuration indicator state identifications, and a same transmission configuration indicator state identification for each of the plurality of component carriers in a millimeter wave frequency band having the same spatial quasi-colocation parameters.

Example 7: The method of example 1, each of the activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

Example 8: A method for wireless communication at a network entity, comprising: identifying a medium access control-control element that indicates, for a plurality of component carriers configured for a UE, a set of one or more active transmission configuration indicator states; determining that a first component carrier and a second component carrier of the plurality of component carriers is associated with the set of one or more active transmission configuration indicator states based at least in part on the identified medium access control-control element; transmitting the medium access control-control element to the UE; and communicating with the UE using at least the first component carrier and the second component carrier based at least in part on the determining.

Example 9: The method of example 8, transmitting the medium access control-control element comprising: transmitting, in the medium access control-control element, a first plurality of entries that are each associated with a corresponding component carrier of the plurality of component carriers, each entry of the first plurality of entries providing a component carrier identification and a bandwidth part identification; and transmitting, in the medium access control-control element, at least a second entry outside of the first plurality of entries that indicates one or more active transmission configuration indicator states for two or more of the plurality of component carriers or bandwidth parts.

Example 10: The method of example 8, further comprising: identifying two or more mappings of active transmission configuration indicator states for the first component carrier and the second component carrier; and transmitting, in the medium access control-control element, an activation command for a first mapping associated with a first set of active transmission configuration indicator states from the set of one or more active transmission configuration indicator states, and a second set of active transmission configuration indicator states for the second component carrier being activated based at least in part on a second mapping provided in the medium access control-control element.

Example 11: The method of example 10, the activation command for the first set of active transmission configuration indicator states indicating one or more bandwidth part identifications, and an identification of the first mapping.

Example 12: The method of example 10, the mappings being transmitted in radio resource control signaling.

Example 13: The method of example 8, each of the plurality of component carriers having an associated set of transmission configuration indicator state identifications, and a same transmission configuration indicator state identification for each of the plurality of component carriers in a millimeter wave frequency band having the same spatial quasi-colocation parameters.

Example 14: The method of example 8, each of the activated transmission configuration indicator states of the set of one or more active transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

Example 15: A method for wireless communication at a UE, comprising: receiving a medium access control-control element from a network entity that indicates, for a plurality of component carriers configured for the UE, two or more sets of active transmission configuration indicator states; determining a first set of active transmission configuration indicator states for a first component carrier and a second set of active transmission configuration indicator states for a second component carrier based at least in part on the received medium access control-control element, the first set of active transmission configuration indicator states being different than the second set of active transmission configuration indicator states; and communicating with the network entity using at least the first component carrier and the second component carrier based at least in part on the determining.

Example 16: The method of example 15, receiving the medium access control-control element comprising: receiving, in the medium access control-control element, a first plurality of entries that are each associated with a corresponding component carrier of the plurality of component carriers, each entry of the first plurality of entries providing a component carrier identification and a bandwidth part identification; and receiving, in the medium access control-control element, at least a second entry outside of the first plurality of entries that indicates one or more active transmission configuration indicator states for two or more of the plurality of component carriers or bandwidth parts.

Example 17: The method of example 15, receiving, in the medium access control-control element, an activation command for the first component carrier, the activation command including a first bit that is set to indicate that different sets of active transmission configuration indicator states are activated for different component carriers of the plurality of component carriers.

Example 18: The method of example 17, identifying, based at least in part on the activation command for the first component carrier, a first active transmission configuration indicator state; identifying a first reference signal ID associated with the first active transmission configuration indicator state; and activating one or more transmission configuration indicator states of at least the second component carrier that are associated with the first reference signal ID.

Example 19: The method of example 18, activating transmission configuration indicator states that are associated with the first reference signal ID of each remaining component carrier of the plurality of component carriers; and; repeating the identifying and activating for one or more other active transmission configuration indicator states provided in the medium access control-control element that include the first bit that is set to indicate that different sets of active transmission configuration indicator states are activated in the plurality of component carriers.

Example 20: The method of example 15, identifying two or more mappings of active transmission configuration indicator states for the first component carrier and the second component carrier; receiving, in the medium access control-control element, an activation command for a first mapping associated with the first set of active transmission configuration indicator states; and activating the first set of active transmission configuration indicator states for the first component carrier based at least in part on the first mapping, the activation command for the first set of active transmission configuration indicator states indicating one or more bandwidth part identifications, and an identification of the first set of active transmission configuration indicator states.

Example 21: The method of example 15, each of the plurality of component carriers having an associated set of transmission configuration indicator state identifications, and a same transmission configuration indicator state identification for each of the plurality of component carriers in a millimeter wave frequency band having the same spatial quasi-colocation parameters.

Example 22: The method of example 15, each of the plurality of activated transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

Example 23: A method for wireless communication at a base station, comprising: determining, for communications with a UE, a first set of active transmission configuration indicator states for a first component carrier of a plurality of component carriers and a second set of active transmission configuration indicator states for a second component carrier of the plurality of component carriers, the first set of active transmission configuration indicator states being different than the second set of active transmission configuration indicator states; transmitting a medium access control-control element to the UE that indicates, for the plurality of component carriers, the first set of active transmission configuration indicator states and the second set of active transmission configuration indicator states; and communicating with the UE using at least the first component carrier and the second component carrier based at least in part on the determining.

Example 24: The method of example 23, transmitting the medium access control-control element comprising: transmitting, in the medium access control-control element, a first plurality of entries that are each associated with a corresponding component carrier of the plurality of component carriers, each entry of the first plurality of entries providing a component carrier identification and a bandwidth part identification; and transmitting, in the medium access control-control element, at least a second entry outside of the first plurality of entries that indicates one or more active transmission configuration indicator states for two or more of the plurality of component carriers or bandwidth parts.

Example 25: The method of example 23, further comprising: transmitting, in the medium access control-control element, an activation command for the first component carrier, the activation command including a first bit that is set to indicate that different sets of active transmission configuration indicator states are activated for different component carriers of the plurality of component carriers.

Example 26: The method of example 25, the activation command indicating a first active transmission configuration indicator state for the first component carrier having an associated first reference signal ID, and one or more transmission configuration indicator states of at least the second component carrier that are associated with the first reference signal ID being activated.

Example 27: The method of example 23, further comprising: transmitting configuration information to the UE that indicates a subset of available transmission configuration indicator states, the subset being less than a total number of configurable transmission configuration indicator states; and the medium access control-control element explicitly indicating which transmission configuration indicator states are active for each component carrier.

Example 28: The method of example 27, transmitting the medium access control-control element further comprising: transmitting, in the medium access control-control element, a first set of bits associated with the first component carrier that indicate which transmission configuration indicator states of the subset of available transmission configuration indicator states are in the first set of active transmission configuration indicator states; and transmitting, in the medium access control-control element, a second set of bits associated with the second component carrier that indicate which transmission configuration indicator states of the subset of available transmission configuration indicator states are in the second set of active transmission configuration indicator states.

Example 29: The method of example 23, each of the plurality of component carriers having an associated set of transmission configuration indicator state identifications, and a same transmission configuration indicator state identification for each of the plurality of component carriers in a millimeter wave frequency band having the same spatial quasi-colocation parameters.

Example 30: The method of example 23, each of the plurality of activated transmission configuration indicator states in the plurality of component carriers and bandwidth parts in a sub-6 GHz frequency band using a same Doppler or delay-related quasi-colocation reference signal as the bandwidth part associated with the activated transmission configuration indicator state.

Example 31: An apparatus for wireless communication comprising at least one means for performing a method of any one of examples 1 through 7.

Example 32: An apparatus for wireless communication comprising at least one means for performing a method of any one of examples 8 through 14.

Example 33: An apparatus for wireless communication comprising at least one means for performing a method of any one of examples 15 through 22.

Example 34: An apparatus for wireless communication comprising at least one means for performing a method of any one of examples 23 through 30.

Example 35: An apparatus for wireless communication comprising a processor and memory coupled to the processor, the processor and memory configured to cause the apparatus to perform a method of any one of examples 1 through 7.

Example 36: An apparatus for wireless communication comprising a processor and memory coupled to the processor, the processor and memory configured to cause the apparatus to perform a method of any one of examples 8 through 14.

Example 37: An apparatus for wireless communication comprising a processor and memory coupled to the processor, the processor and memory configured to cause the apparatus to perform a method of any one of examples 15 through 22.

Example 38: An apparatus for wireless communication comprising a processor and memory coupled to the processor, the processor and memory configured to cause the apparatus to perform a method of any one of examples 23 through 30.

Example 39: A non-transitory computer-readable medium storing code for wireless communication comprising a processor, memory in electronic communication with the processor, and instructions stored in the memory and executable by the processor to cause the apparatus to perform a method of any one of examples 1 through 7.

Example 40: A non-transitory computer-readable medium storing code for wireless communication comprising a processor, memory in electronic communication with the processor, and instructions stored in the memory and executable by the processor to cause the apparatus to perform a method of any one of examples 8 through 14.

Example 41: A non-transitory computer-readable medium storing code for wireless communication comprising a processor, memory in electronic communication with the processor, and instructions stored in the memory and executable by the processor to cause the apparatus to perform a method of any one of examples 15 through 22.

Example 42: A non-transitory computer-readable medium storing code for wireless communication comprising a processor, memory in electronic communication with the processor, and instructions stored in the memory and executable by the processor to cause the apparatus to perform a method of any one of examples 23 through 30.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a medium access control-control element (MAC-CE) that indicates, for a plurality of component carriers configured for the UE, a first set of one or more transmission configuration indicator (TCI) states, wherein the MAC-CE comprises an indication of one or more TCI state identifiers (IDs), each TCI state ID of the one or more TCI state IDs is associated with a first component carrier identified by the MAC-CE and with one or more additional component carriers not identified by the MAC-CE, and wherein the first component carrier and the one or more additional component carriers are of the plurality of component carriers; and
   activating a same set of TCI states of the first set of one or more TCI states for a subset of component carriers of the plurality of component carriers based at least in part on the received MAC-CE and the indication of the one or more TCI state IDs, wherein the subset of component carriers comprises the first component carrier.

2. The method of claim 1, wherein each TCI state ID of the one or more TCI state IDs is associated with a component carrier identification and a bandwidth part identification.

3. The method of claim 1, further comprising:
   identifying two or more mappings of TCI states for the plurality of component carriers;
   receiving, in the MAC-CE, an activation command for a first mapping associated with the same set of TCI states from the first set of one or more TCI states; and
   activating the same set of TCI states based at least in part on the first mapping.

4. The method of claim 3, wherein the activation command for the same set of TCI states indicates one or more bandwidth part identifications, and an identification of the same set of TCI states.

5. The method of claim 4, wherein the first mapping is received from a network entity in radio resource control signaling.

6. The method of claim 1, wherein each of the plurality of component carriers has an associated set of TCI state IDs, and a same TCI state ID for each of the plurality of component carriers in a millimeter wave frequency band has same corresponding spatial quasi-colocation parameters.

7. The method of claim 1, wherein each TCI state of the first set of one or more TCI states associated with the plurality of component carriers and bandwidth parts in a sub-6 GHz frequency band uses a same Doppler or delay-related quasi-colocation reference signal as a bandwidth part associated with an activated TCI state.

8. The method of claim 1, further comprising:
communicating with a network entity using at least a portion of the subset of component carriers based at least in part on the activating.

9. The method of claim 1, wherein the indication of the one or more TCI state IDs indicates, for which one or more individual TCI state IDs of the one or more TCI state IDs, a corresponding TCI state of the first set of one or more TCI states is to be activated.

10. A method for wireless communication at a network entity, comprising:
identifying a medium access control-control element (MAC-CE) that indicates, for a plurality of component carriers configured for a user equipment (UE), a first set of one or more transmission configuration indicator (TCI) states, wherein the MAC-CE comprises an indication of one or more TCI state identifiers (IDs), each TCI state ID of the one or more TCI state IDs is associated with a first component carrier identified by the MAC-CE and with one or more additional component carriers not identified by the MAC-CE, and wherein the first component carrier and the one or more additional component carriers are of the plurality of component carriers;
determining that a same set of TCI states of the first set of one or more TCI states for a subset of component carriers of the plurality of component carriers is to be activated based at least in part on the identified MAC-CE and the indication of the one or more TCI state IDs, wherein the subset of component carriers comprises the first component carrier; and
transmitting the MAC-CE.

11. The method of claim 10, wherein each TCI state ID of the one or more TCI state IDs is associated with a component carrier identification and a bandwidth part identification.

12. The method of claim 10, further comprising:
identifying two or more mappings of TCI states for the plurality of component carriers; and
transmitting, in the MAC-CE, an activation command for a first mapping associated with the same set of TCI states from the first set of one or more TCI states.

13. The method of claim 12, wherein the activation command for the same set of TCI states indicates one or more bandwidth part identifications, and an identification of the first mapping.

14. The method of claim 13, wherein the two or more mappings are transmitted in radio resource control signaling.

15. The method of claim 10, wherein each of the plurality of component carriers has an associated set of TCI state IDs, and a same TCI state ID for each of the plurality of component carriers in a millimeter wave frequency band has same corresponding spatial quasi-colocation parameters.

16. The method of claim 10, wherein each TCI state of the first set of one or more TCI states associated with the plurality of component carriers and bandwidth parts in a sub-6 GHz frequency band uses a same Doppler or delay-related quasi-colocation reference signal as a bandwidth part associated with an activated TCI state.

17. The method of claim 10, further comprising:
communicating with the UE using at least a portion of the subset of component carriers based at least in part on the determining.

18. The method of claim 10, wherein the indication of the one or more TCI state IDs indicates, for which one or more individual TCI state IDs of the one or more TCI state IDs, a corresponding TCI state of the first set of one or more TCI states is to be activated.

19. A method for wireless communication at a user equipment (UE), comprising:
receiving a medium access control-control element (MAC-CE) from a network entity that indicates, for a plurality of component carriers configured for the UE, two or more sets of transmission configuration indicator (TCI) states, wherein the MAC-CE comprises an indication of one or more TCI state identifiers (IDs), each TCI state ID of the one or more TCI state IDs is associated with a first component carrier identified by the MAC-CE and with one or more additional component carriers not identified by the MAC-CE, and wherein the first component carrier and the one or more additional component carriers are of the plurality of component carriers; and
activating a first set of TCI states for the first component carrier and a second set of TCI states for a second component carrier based at least in part on the received MAC-CE and the indication of the one or more TCI state IDs.

20. The method of claim 19, wherein each TCI state ID of the one or more TCI state IDs is associated with a component carrier identification and a bandwidth part identification.

21. The method of claim 19, further comprising:
receiving, in the MAC-CE, an activation command for the first component carrier, the activation command including a first bit that is set to indicate that different sets of TCI states are activated for different component carriers of the plurality of component carriers.

22. The method of claim 21, further comprising:
identifying, based at least in part on the activation command for the first component carrier, a first TCI state;
identifying a first reference signal ID associated with the first TCI state; and
activating one or more TCI states of at least the second component carrier that are associated with the first reference signal ID.

23. The method of claim 22, further comprising:
activating TCI states that are associated with the first reference signal ID of each remaining component carrier of the plurality of component carriers; and
repeating the activating for one or more other TCI states provided in the MAC-CE that include the first bit that is set to indicate that different sets of TCI states are activated in the plurality of component carriers.

24. The method of claim 19, further comprising:
identifying two or more mappings of TCI states for the first component carrier and the second component carrier;
receiving, in the MAC-CE, an activation command for a first mapping associated with the first set of TCI states; and
activating the first set of TCI states for the first component carrier based at least in part on the first mapping, wherein the activation command for the first set of TCI states indicates one or more bandwidth part identifications, and an identification of the first set of TCI states.

25. The method of claim 19, wherein each of the plurality of component carriers has an associated set of TCI state IDs, and a same TCI state ID for each of the plurality of component carriers in a millimeter wave frequency band has same corresponding spatial quasi-colocation parameters.

26. The method of claim 19, wherein each TCI state associated with the plurality of component carriers and bandwidth parts in a sub-6 GHz frequency band uses a same Doppler or delay-related quasi-colocation reference signal as a bandwidth part associated with an activated TCI state.

27. A method for wireless communication at a network entity, comprising:
determining, for communications with a user equipment (UE), a first set of transmission configuration indicator (TCI) states for a first component carrier of a plurality of component carriers and a second set of TCI states for a second component carrier of the plurality of component carriers; and
transmitting a medium access control-control element (MAC-CE) that indicates, for the plurality of component carriers, the first set of TCI states and the second set of TCI states, wherein the MAC-CE comprises an indication of one or more TCI state identifiers (IDs), each TCI state ID of the one or more TCI state IDs associated with the first component carrier identified by the MAC-CE and with one or more additional component carriers not identified by the MAC-CE, and wherein the first component carrier and the one or more additional component carriers are of the plurality of component carriers.

28. The method of claim 27, wherein each TCI state ID of the one or more TCI state IDs is associated with a component carrier identification and a bandwidth part identification.

29. The method of claim 27, further comprising:
transmitting, in the MAC-CE, an activation command for the first component carrier, the activation command including a first bit that is set to indicate that different sets of TCI states are activated for different component carriers of the plurality of component carriers.

30. The method of claim 29, the activation command indicating a first TCI state for the first component carrier having a first reference signal ID, and one or more TCI states of at least the second component carrier that are associated with the first reference signal ID being activated.

31. The method of claim 27, further comprising:
transmitting configuration information that indicates a subset of available TCI states, the subset being less than a total number of configurable TCI states; and
the MAC-CE explicitly indicating which TCI states are active for each component carrier.

32. The method of claim 31, transmitting the MAC-CE further comprising:
transmitting, in the MAC-CE, a first set of bits associated with the first component carrier that indicate which TCI states of the subset of available TCI states are in the first set of TCI states; and
transmitting, in the MAC-CE, a second set of bits associated with the second component carrier that indicate which TCI states of the subset of available TCI states are in the second set of TCI states.

33. The method of claim 27, wherein each of the plurality of component carriers has an associated set of TCI state IDs, and a same TCI state ID for each of the plurality of component carriers in a millimeter wave frequency band has same corresponding spatial quasi-colocation parameters.

34. The method of claim 27, wherein each TCI state associated with the plurality of component carriers and bandwidth parts in a sub-6 GHz frequency band uses a same Doppler or delay-related quasi-colocation reference signal as a bandwidth part associated with an activated TCI state.

35. An apparatus for wireless communication at a user equipment (UE), comprising:
one or more memories; and
one or more processors coupled with the one or more memories and configured to cause the UE to:
receive a medium access control-control element (MAC-CE) that indicates, for a plurality of component carriers configured for the UE, a first set of one or more transmission configuration indicator (TCI) states, wherein the MAC-CE comprises an indication of one or more TCI state identifiers (IDs), each TCI state ID of the one or more TCI state IDs is associated with a first component carrier identified by the MAC-CE and with one or more additional component carriers not identified by the MAC-CE, and wherein the first component carrier and the one or more additional component carriers are of the plurality of component carriers; and
activate a same set of TCI states of the first set of one or more TCI states for a subset of component carriers of the plurality of component carriers based at least in part on the received MAC-CE and the indication of the one or more TCI state IDs, wherein the subset of component carriers comprises the first component carrier.

36. The apparatus of claim 35, wherein each TCI state ID of the one or more TCI state IDs is associated with a component carrier identification and a bandwidth part identification.

37. The apparatus of claim 35, wherein the one or more processors are configured to cause the UE to:
identify two or more mappings of TCI states for the plurality of component carriers;
receive, in the MAC-CE, an activation command for a first mapping associated with the same set of TCI states from the first set of one or more TCI states; and
activate the same set of TCI states based at least in part on the first mapping.

38. The apparatus of claim 37, wherein the activation command for the same set of TCI states indicates one or more bandwidth part identifications, and an identification of the same set of TCI states.

39. The apparatus of claim 38, wherein the first mapping is received from a network entity in radio resource control signaling.

40. The apparatus of claim 35, wherein each of the plurality of component carriers having an associated set of TCI state IDs, and a same TCI state ID for each of the plurality of component carriers in a millimeter wave frequency band has same corresponding spatial quasi-colocation parameters.

41. The apparatus of claim 35, wherein each TCI state of the first set of one or more TCI states associated with the plurality of component carriers and bandwidth parts in a sub-6 GHz frequency band uses a same Doppler or delay-related quasi-colocation reference signal as a bandwidth part associated with an activated TCI state.

42. The apparatus of claim 35, wherein the indication of the one or more TCI state IDs indicates, for which one or more individual TCI state IDs of the one or more TCI state IDs, a corresponding TCI state of the first set of one or more TCI states is to be activated.

43. An apparatus for wireless communication at a network entity, comprising:
one or more memories; and
one or more processors coupled with the one or more memories and configured to cause the network entity to:
identify a medium access control-control element (MAC-CE) that indicates, for a plurality of component carriers configured for a user equipment (UE), a first set of one or more transmission configuration indicator (TCI) states, wherein the MAC-CE comprises an indication of one or more TCI state identifiers (IDs), each TCI state ID of the one or more TCI state IDs is associated with a first component carrier identified by the MAC-CE and with one or more additional component carriers not identified by the MAC-CE, and wherein the first component carrier and the one or more additional component carriers are of the plurality of component carriers;
determine that a same set of TCI states of the first set of one or more TCI states for a subset of component carriers of the plurality of component carriers is to be activated based at least in part on the identified MAC-CE and the indication of the one or more TCI state IDs, wherein the subset of component carriers comprises the first component carrier; and
transmit the MAC-CE.

44. The apparatus of claim 43, wherein each TCI state ID of the one or more TCI state IDs is associated with a component carrier identification and a bandwidth part identification.

45. The apparatus of claim 43, wherein the one or more processors are configured to cause the network entity to:
identify two or more mappings of TCI states for the plurality of component carriers; and
transmit, in the MAC-CE, an activation command for a first mapping associated with the same set of TCI states from the first set of one or more TCI states.

46. The apparatus of claim 45, wherein the activation command for the same set of TCI states indicates one or more bandwidth part identifications, and an identification of the first mapping.

47. The apparatus of claim 43, wherein the two or more mappings are transmitted in radio resource control signaling.

48. The apparatus of claim 40, wherein each of the plurality of component carriers has an associated set of TCI state IDs, and a same TCI state ID for each of the plurality of component carriers in a millimeter wave frequency band has same corresponding spatial quasi-colocation parameters.

49. The apparatus of claim 43, wherein each TCI states of the first set of one or more TCI states associated with the plurality of component carriers and bandwidth parts in a sub-6 GHz frequency band uses a same Doppler or delay-related quasi-colocation reference signal as a bandwidth part associated with an activated TCI state.

50. The apparatus of claim 43, wherein the indication of the one or more TCI state IDs indicates, for which one or more individual TCI state IDs of the one or more TCI state IDs, a corresponding TCI state of the first set of one or more TCI states is to be activated.

51. An apparatus for wireless communication at a user equipment (UE), comprising:
means for receiving a medium access control-control element (MAC-CE) that indicates, for a plurality of component carriers configured for the UE, a first set of one or more transmission configuration indicator (TCI) states, wherein the MAC-CE comprises an indication of one or more TCI state identifiers (IDs), each TCI state ID of the one or more TCI state IDs associated with a first component carrier identified by the MAC-CE and with one or more additional component carriers not identified by the MAC-CE, and wherein the first component carrier and the one or more additional component carriers are of the plurality of component carriers; and
means for activating a same set of TCI states of the first set of one or more TCI states for a subset of component carriers of the plurality of component carriers based at least in part on the received MAC-CE and the indication of the one or more TCI state IDs, wherein the subset of component carriers comprises the first component carrier.

52. The apparatus of claim 51, wherein each TCI state ID of the one or more TCI state IDs is associated with a component carrier identification and a bandwidth part identification.

53. The apparatus of claim 51, wherein the indication of the one or more TCI state IDs indicates, for which one or more individual TCI state IDs of the one or more TCI state IDs, a corresponding TCI state of the first set of one or more TCI states is to be activated.

54. An apparatus for wireless communication at a network entity, comprising:
means for identifying a medium access control-control element (MAC-CE) that indicates, for a plurality of component carriers configured for a user equipment (UE), a first set of one or more transmission configuration indicator (TCI) states, wherein the MAC-CE comprises an indication of one or more TCI state identifiers (IDs), each TCI state ID of the one or more TCI state IDs associated with a first component carrier identified by the MAC-CE and with one or more additional component carriers not identified by the MAC-CE, and wherein a first component carrier and the one or more additional component carriers are of the plurality of component carriers;
means for determining that a same set of TCI states of the first set of one or more TCI states for a subset of component carriers of the plurality of component carriers is to be activated based at least in part on the identified MAC-CE and the indication of the one or more TCI state IDs, wherein the subset of component carriers comprises the first component carrier; and
means for transmitting the MAC-CE.

55. The apparatus of claim 54, wherein each TCI state ID of the one or more TCI state IDs is associated with a component carrier identification and a bandwidth part identification.

56. The apparatus of claim 54, wherein the indication of the one or more TCI state IDs indicates, for which one or more individual TCI state IDs of the one or more TCI state IDs, a corresponding TCI state of the first set of one or more TCI states is to be activated.

57. A non-transitory computer-readable medium storing code for wireless communication at a user equipment (UE), the code comprising instructions executable by one or more processors to cause the UE to:
receive a medium access control-control element (MAC-CE) that indicates, for a plurality of component carriers configured for the UE, a first set of one or more transmission configuration indicator (TCI) states, wherein the MAC-CE comprises an indication of one or more TCI state identifiers (IDs), each TCI state ID of the one or more TCI state IDs associated with a first component carrier identified by the MAC-CE and with one or more additional component carriers not identified by the MAC-CE, and wherein the first component carrier and the one or more additional component carriers are of the plurality of component carriers; and
activate a same set of TCI states of the first set of one or more TCI states for a subset of component carriers of the plurality of component carriers based at least in part on the received MAC-CE and the indication of the one or more TCI state IDs, wherein the subset of component carriers comprises the first component carrier.

58. The non-transitory computer-readable medium of claim 57, wherein each TCI state ID of the one or more TCI state IDs is associated with a component carrier identification and a bandwidth part identification.

59. The non-transitory computer-readable medium of claim 57, wherein the indication of the one or more TCI state IDs indicates, for which one or more individual TCI state IDs of the one or more TCI state IDs, a corresponding TCI state of the first set of one or more TCI states is to be activated.

60. A non-transitory computer-readable medium storing code for wireless communication at a network entity, the code comprising instructions executable by one or more processors to cause the network entity to:
identify a medium access control-control element (MAC-CE) that indicates, for a plurality of component carriers configured for a user equipment (UE), a first set of one or more transmission configuration indicator (TCI) states, wherein the MAC-CE comprises an indication of one or more TCI state identifiers (IDs), each TCI state ID of the one or more TCI state IDs associated with a first component carrier identified by the MAC-CE and with one or more additional component carriers not identified by the MAC-CE, and wherein the first component carrier and the one or more additional component carriers are of the plurality of component carriers;
determine that a same set of TCI states of the first set of one or more TCI states for a subset of component carriers of the plurality of component carriers is to be activated based at least in part on the identified MAC-CE and the indication of the one or more TCI state IDs, wherein the subset of component carriers comprises the first component carrier; and
transmit the MAC-CE.

61. The non-transitory computer-readable medium of claim 60, wherein each TCI state ID of the one or more TCI state IDs is associated with a component carrier identification and a bandwidth part identification.

62. The non-transitory computer-readable medium of claim 60, wherein the indication of the one or more TCI state IDs indicates, for which one or more individual TCI state IDs of the one or more TCI state IDs, a corresponding TCI state of the first set of one or more TCI states is to be activated.

* * * * *